US006418448B1

(12) United States Patent
Sarkar

(10) Patent No.: US 6,418,448 B1
(45) Date of Patent: Jul. 9, 2002

(54) METHOD AND APPARATUS FOR PROCESSING MARKUP LANGUAGE SPECIFICATIONS FOR DATA AND METADATA USED INSIDE MULTIPLE RELATED INTERNET DOCUMENTS TO NAVIGATE, QUERY AND MANIPULATE INFORMATION FROM A PLURALITY OF OBJECT RELATIONAL DATABASES OVER THE WEB

(76) Inventor: Shyam Sundar Sarkar, 273 Laurie Meadows Dr. Apt. #142, San Mateo, CA (US) 94403

( * ) Notice: Subject to any disclaimer, the term of this patent is extended or adjusted under 35 U.S.C. 154(b) by 0 days.

(21) Appl. No.: 09/455,422

(22) Filed: Dec. 6, 1999

(51) Int. Cl.$^7$ .............................................. G06F 17/30

(52) U.S. Cl. ...................... 707/104.1; 707/1; 707/100; 707/101; 707/103; 709/229; 709/203

(58) Field of Search ............................. 707/104.1, 103, 707/100, 101, 1; 709/203, 229

(56) References Cited

U.S. PATENT DOCUMENTS

| | | | | |
|---|---|---|---|---|
| 5,561,795 A | * | 10/1996 | Sarkar ......................... | 707/202 |
| 5,687,361 A | * | 11/1997 | Sarkar ............................ | 707/1 |
| 5,737,592 A | | 4/1998 | Nguyen et al. ................. | 707/4 |
| 5,878,419 A | | 3/1999 | Carter et al. .................... | 707/10 |
| 5,893,118 A | | 4/1999 | Sonderegger et al. ........ | 707/203 |
| 5,895,465 A | | 4/1999 | Guha et al. ..................... | 707/4 |
| 6,012,067 A | | 1/2000 | Sarkar ......................... | 707/103 |
| 6,044,466 A | * | 3/2000 | Anand et al. ................. | 713/200 |
| 6,145,738 A | * | 11/2000 | Stinson et al. ............... | 235/379 |
| 6,177,932 B1 | * | 1/2001 | Galdes et al. ................ | 345/329 |
| 2001/0039563 A1 | * | 11/2001 | Tian ............................ | 709/202 |

OTHER PUBLICATIONS

Swick, Ralph R., "Putting It Together: RDF:Weaving the Web of Discovery," ACM, pp. 21–25, Jun. 1999.*

Lee et al. "Information Integration with Attribution Support for Corporate Profiles," ACM, pp. 423–429, 1999.*

"Developing Stored Procedures in Java"—An Oracle Technical White Paper, Apr. 1999.

(List continued on next page.)

*Primary Examiner*—Charles L. Rones

(57) ABSTRACT

The present invention provides a system for navigation through multiple documents in Extensible Markup Language and Resource Description Framework to inspect data/metadata in order to either start a transaction on selected item(s) in separate thin client window(s) with persistent connectivity through Internet Inter ORB Protocol or implicitly trigger read-only queries in Structured Query Language (SQL) represented in Resource Description Framework against a unified virtual Database defined over multiple physical disparate object relational databases over the web. An implicitly generated query retrieves desired sets of properties and entities presented in documents of Extensible Markup Language and Resource Description Framework for further navigation. Container types in Resource Description Framework are mapped by this invention to record and table types in a normalized relational model where URIs locating elements in relational schema components over the web are stored as primary keys/foreign keys in normalized tables. Methods and operators on such web objects are defined as part of user-defined package definitions in object relational schema where object request brokers apply such methods or operators on result sets from relational operations anywhere on the web. This invention uniquely incorporates two distinct stages of SQL computations for a collaborative method of preparation, execution and resolution of an object SQL query over disparate locations of multiple object relational databases on the web.

15 Claims, 24 Drawing Sheets

OTHER PUBLICATIONS

"Deploying Enterprise Java Beans in the Oracle8i Server"—Oracle White Paper, Apr. 1999.

Extending INFORMIX—Univesal Server: User–Defined Routines, Version 9.1, Mar. 1997.

"Resource Description Framework (RDE) Model and Syntax Specification"—W3C Recommendation, Feb. 22, 1999.

XML 1.0 (http://www.w3.org/TR/1998/REC–XML–19980210)—W3C Recommendation Feb. 10, 1998.

"A Query and Inference Service for RDF" Stefan D. et al., [http://www.w3.org/TandS/QL/QL98/pp/queryservice.html] 1998.

* cited by examiner

```
<?xml version="1.0"?>
<rdf:RDF
    xmlns:rdf="http://www.w3.org/1999/02/22-rdf-syntax-ns#"
    xmlns:s="http://description.org/schema/"
    xmlns:v="http://description.org/schema1/">
    <rdf:Description about="http://www.exml.com/John">
      <s:Creator>
      <rdf:Description about="http://www.exml.com/empl_no/1234"
            <v:Name>Jeremy</v:Name>
            <v:Email>Jeremy@exml.com</v:Email>
      </rdf:Description>
      </s:Creator>
      <rdf:Description>
<rdf:RDF>
```

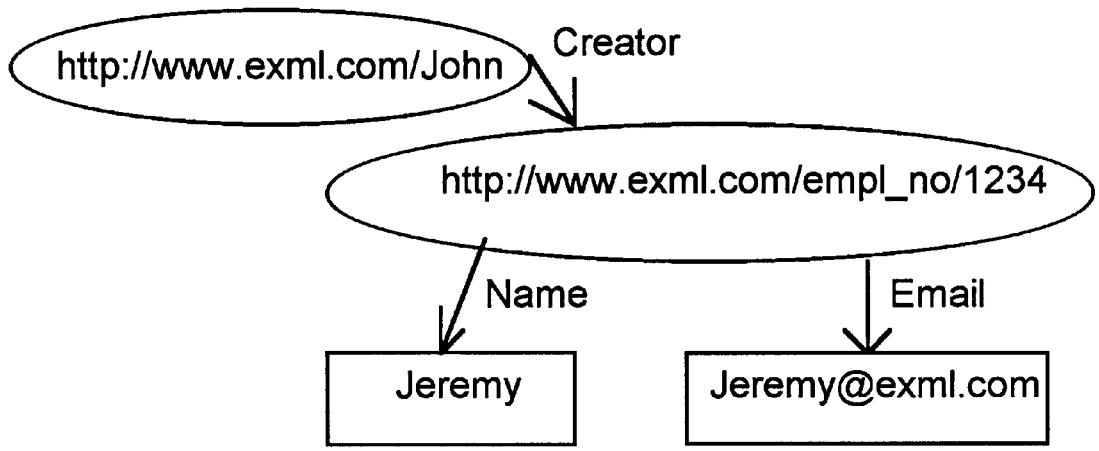

FIG 7a.

```
<rdf:RDF>
  <rdf:Description about="http://exml.com/item">
    <s:authors>
      <rdf:Bag>
        <rdf:li  resource="http://exml.com/authors/Joe"/>
        <rdf:li  resource="http://exml.com/authors/John"/>
        <rdf:li  resource="http://exml.com/authors/Merry"/>
      </rdf:Bag>
    </s:authors>
  </rdf:Description>
</rdf:RDF>
```

(Primary key)
URI (Other Attributes)

| http://exml.com/item | ..... | | :: Relation R1 |

| URI | Author-of | |
|---|---|---|
| http://exml.com/authors/Joe | http://exml.com/item | ......... |
| http://exml.com/authors/John | http://exml.com/item | ......... |
| http://exml.com/authors/Merry | http://exml.com/item | ......... |

Relation R2 ::

(Primary Key)  (Foreign Key)  (Other Attributes)

One to many (1:N) relationship between R1 and R2 (1st Normal Form)

(Primary key): URI    (Other Attributes)

| http://exml.com/item | ..... | | :: Relation R1 |

(Primary key): URI    (Other Attributes)

| http://exml.com/authors/Joe | ..... | | :: Relation R2 |

| Author (URI) | Item (URI) |
|---|---|
| http://exml.com/authors/Joe | http://exml.com/item |
| http://exml.com/authors/John | http://exml.com/item |
| http://exml.com/authors/Merry | http://exml.com/item |

:: Relation R3

Many to many (M:N) relationship between R1 and R2 (2nd Normal Form)

FIG 8b.

```
<rdf:RDF>
<rdf:Description about="http://exml.com/download/software">
    <s:AlternateSites>
      <rdf:Alt>
        <rdf:li resource="ftp://ftp.exml1.com"/>
        <rdf:li resource="ftp://ftp.exml2.com"/>
        <rdf:li resource="ftp://ftp.exml3.com"/>
      </rdf:Alt>
    </s:AlternateSites>
 </rdf:Description>
</rdf:RDF>
```

| (Primary Key) : URI | Tag | Other Attributes | |
|---|---|---|---|
| http://exml.com/download/software | 1 | ...... | |
| http://exml.com/download/software | 2 | ...... | :: R1 |
| http://exml.com/download/software | 3 | ...... | |

Foreign Keys 1 and 2    (Primary Key) : URI   Other Attributes

| | | | | |
|---|---|---|---|---|
| http://exml.com/download/software | 1 | ftp://ftp.exml1.com | ...... | |
| http://exml.com/download/software | 2 | ftp://ftp.exml2.com | ...... | :: R2 |
| http://exml.com/download/software | 3 | ftp://ftp.exml3.com | ...... | |

Relations R1 and R2 are in One to One (1:1) relationship

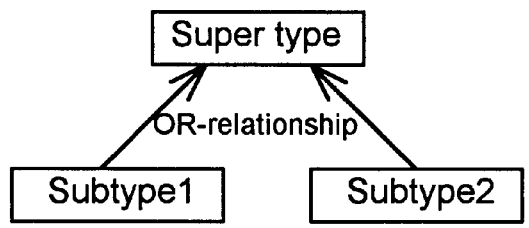

Generalization/specialization :: 1:1 relationship

FIG 9b.

```
<rdf:RDF>
 <rdf:Description about="http://exml.com/PapersByDate">
  <s:dateSequence>
   <rdf:Seq>
    <rdf:li resource="http://exml.com/Jan99.html"/>
    <rdf:li resource="http://exml.com/Feb99.html"/>
    <rdf:li resource="http://exml.com/Mar99.html"/>
   </ rdf:Seq>
  </ s:dateSequence>
 </ rdf:Description>
</ rdf:RDF>
```

| Primary key (1) | Primary Key (2) | Primary Key (3) | Other Attributes |
|---|---|---|---|
|  |  |  |  |
| ......... | .......... | .......... | .......... |
|  |  |  |  |

| | | |
|---|---|---|
| http://exml.com/PapersByDate | http://exml.com/Jan99.html | .......... |
| .................... | ................ | .......... |
| http://exml.com/PapersByDate | http://exml.com/Feb99.htm | .......... |
| .................... | ................ | .......... |
| http://exml.com/PapersByDate | http://exml.com/Mar99.htm | .......... |
| .................... | ................. | .......... |

Compound Primary Keys In Relations For Maintaining Sequenc

FIG 10b.

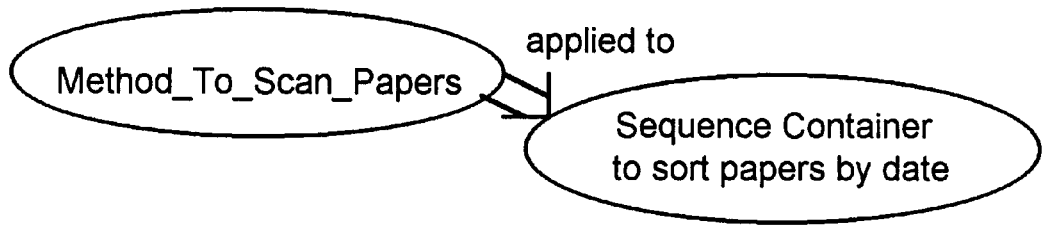

```
<rdf:RDF>

<rdf:Description about="http://exml.com/PapersByDate">

<s:Method_To_Scan_Papers>
      <s:input_param name="sequence_of_papers" type="rdf:Seq">
        <s:dateSequence>
          <rdf:Seq>
            <rdf:li resource="http://exml.com/jan99.html"/>
            <rdf:li resource="http://exml.com/feb99.html"/>
            <rdf:li resource="http://exml.com/mar99.html"/>
          </rdf:Seq>
        </s:dateSequence>
      </s:input_param>
      <s:input_param name="count" type="int">
        3
      </s:input_param>
      <s:output_param name="word_count" type="int" />
    </s:Method_To_Scan_Papers>

</rdf:Description>
</rdf:RDF>
```

FIG 12.

```
<rdf:RDF>

<rdf:Description about="http://exmpl_join.com/example">
   <s:Join_query>
    <q:Select>
     <q:Project>

<q:li  resource="http://exmpl_join.com/ex1"  attribute="Name3"/>
        <q:li  resource="http://exmpl_join.com/ex2"  attribute="Name4"/>
        <q:li  resource="http://exmpl_join.com/ex2"  attribute="Name5"/>

</q:Project>
     <q:From>

<q:li  resource="http://exmpl_join.com/ex1" />
        <q:li  resource="http://exmpl_join.com/ex2" />

</q:From>
     <q:Where>
       <q:EquiJoin>
         <q:li  resource="http://exmpl_join.com/ex1"  attribute="Name1" />
         <q:li  resource="http://exmpl_join.com/ex2"  attribute="Name2" />

</q:EquiJoin>
     </q:Where>
    </q:Select>
   </s:Join_query>
  </rdf:Description>
</rdf:RDF>
```

FIG 14.

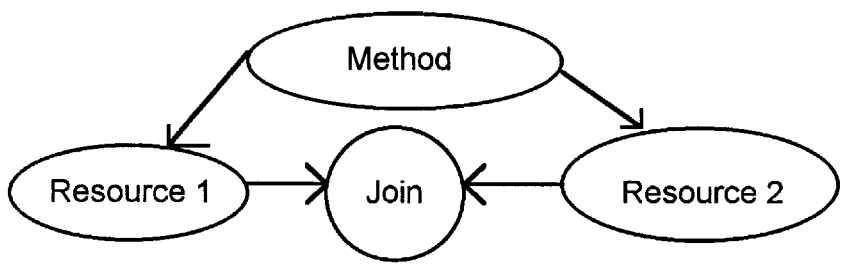

```
<rdf:RDF>
<rdf:Description about="http://exmpl_join.com/example">

<s:Join_query>
   <q:Select>
    <q:Project>
     <s:Method_Interface_1>
      <s:input_param type="int">
       <s:name1>
        <s:li resource="http://exmpl_join.com/ex1" attribute="Name3"/>
       </s:name1>
      </s:input_param>

<s:input_param type="string">
       <s:name2>
        <s:li resource="http://exmpl_join.com/ex2" attribute="Name4"/>
       </s:name2>
      </s:input_param>
     </s:Method_Interface_1>

</q:Project>
    <q:From>
     <q:li resource="http://exmpl_join.com/ex1" />
     <q:li resource="http://exmpl_join.com/ex2" />
    </q:From>

<q:Where>
     <q:EquiJoin>
      <q:li resource="http://exmpl_join.com/ex1" attribute="Name1" />
      <q:li resource="http://exmpl_join.com/ex2" attribute="Name2" />
     </q:EquiJoin>
    </q:Where>

</q:Select>
  </s:Join_query>
 </rdf:Description>
</rdf:RDF>
```

FIG 15.

METHOD AND APPARATUS FOR PROCESSING MARKUP LANGUAGE SPECIFICATIONS FOR DATA AND METADATA USED INSIDE MULTIPLE RELATED INTERNET DOCUMENTS TO NAVIGATE, QUERY AND MANIPULATE INFORMATION FROM A PLURALITY OF OBJECT RELATIONAL DATABASES OVER THE WEB

RELATED APPLICATIONS

This application is based on commonly owned U.S. Pat. No. 6,012,067 issued Jan. 4, 2000, entitled "Method And Apparatus For Storing And Manipulating Objects In A Plurality of Relational Data managers On The Web".

BACKGROUND OF THE INVENTION

1. Field of the invention

This invention relates to data and metadata management over the internet for navigating, querying and manipulating any kind of information by using and executing high level specifications in Resource Description Framework and by supporting multiple object relational database resources over the web. With the advancement of World Wide Web, a large number of different types of objects (text, file, audio, video, image as well as relational data) are being created everyday. Internet can be visualized as a large single database. Querying and manipulating such a large database from many different perspectives is a nontrivial task. Additionally, transactions over the web, electronic commerce with complex buyer/seller relationships and distributed many tier application architecture are also posing demand for new technology solutions. This invention relates to those specific technology needs (a) by incorporating advanced metadata specifications in extensible markup language for implicit generation of object SQL queries in conjunction with navigational capabilities and (b) by incorporating need-based persistent connectivity through object brokers to support transactions over database web entities.

2. Description of the Prior Art

Internet is becoming an important channel for retail commerce as well as business to business transactions. The number of web buyers, sellers and transactions is growing at a rapid pace. But the potential for the internet for truly transforming commerce and business still remains to be fully realized. Electronic purchases are still largely non-automated. Software techniques are required to automate several of the most time consuming stages of web surfing and buying/selling processes. Additionally, business to business web transactions are demanding seamless query facilities over all kinds of information at the front end web portal sites as well as at the back end relational databases in a connected enterprise. Uniform querying, decision support and transactional characteristics need to be present over any kind of web data despite of the fact that data may or may not be immediately present in a single relational database. So far transactional and query capabilities are limited to data residing inside a relational database whereas text and multimedia data residing at a web site are only viewed by the use of Hyper Text Markup Language (HTML). The World Wide Web was originally built for human consumption, and although everything on it is machine-readable, everything is not machine-understandable. It is hard to automate anything on the web, and because of the volume of information the web contains, it is not possible to manage it manually.

W3C (web address http://www.w3c.org) is an international industry consortium to lead the World Wide Web to its full potential by developing common protocols that promote its evolution and ensure its interoperability. The solutions so far proposed by W3C in Extensible Markup Language (XML) and Resource Description Framework (RDF) incorporate metadata to describe the data contained on the web. Metadata is "data about data" or specifically "data describing Web resources" in the context of the World Wide Web. The distinction between "data" and "metadata" is not an absolute one and it is a distinction created primarily by an application. Programs and autonomous agents can gain knowledge about data from metadata specifications.

The RDF model draws well-established principles from various data representation communities. RDF properties may be thought of as attributes of resources and in this sense correspond to traditional attribute-value pairs. The basic model consists of three object types,:

(1) Resources: All things being described by RDF expressions are called resources. A resource may be an entire Web page; for example the HTML document http://www.w3.org/Overview.html. A resource may be a part of a Web page; e.g. a specific HTML or XML element within a document source. A resource may also be a whole collection of pages; e.g. an entire Web site. Resources are identified by universal resource identifiers or URIs. Anything can have URI; the extensibility of URIs allows the introduction of identifiers for any imaginable entity.

(2) Properties: A property is a specific aspect, characteristic, attribute or relation used to describe a resource. Each property has a specific meaning, defines its permitted values, the types of resources it can describe, and its relationship with other properties.

(3) Statements: A specific resource together with a named property plus the value of that property for that resource is a RDF statement. These three individual parts of a statement are called, respectively, the subject, the predicate and the object. The object of a statement (i.e. the property value) can be another resource or it can be a literal, i.e. a resource (specified by a URI) or a simple string or other primitive data type defined by XML.

A simple example statement "John Doe is the creator of the resource http://www.w3.org/home/John" has the Subject (resource) http://www.w3.org/home/John, Predicate (property) as "Creator" and Object (literal) as "John Doe". Meaning in RDF is expressed through reference to a schema. A schema is a place where definitions and restrictions of usage for properties are documented. In order to avoid conflicts in definitions of the same term, RDF uses the XML namespace facility where a specific use of a word is tied to the dictionary (schema) where the definition exists. Each predicate used in a statement must be identified with exactly one namespace, or schema. RDF model also allows qualified property value where the object of the original statement is the structured value and the qualifiers are further properties of a common resource. To represent a collection of resources, RDF uses an additional resource that identifies the specific collection. This resource should be declared to be an instance of one of the container object types, namely, (1) Bag (an unordered list of resources or literals), (2) Sequence (an ordered list of resources or literals) and (3) Alternative (a list of resources or literals that represent alternatives for the single value of a property).

A common use of containers is the value of a property. When used in this way, the statement still has a single statement object regardless of the number of members in the container; the container resource itself is the object of the statement.

Use of metadata was so far popular in relational databases to describe attributes, number and types of columns in tables, foreign-key/primary-key relationships, views etc. in a relational schema. SQL (Structured Query Language) queries made against a relational schema are resolved by fetching metadata from data dictionaries (or repository for metadata definitions) to interpret data fetched from data files during execution of a relational operation. Query executions are independent of any application domain specific features. In a similar manner, Resource Description Framework (RDF) is a foundation for representing and processing metadata and data for the World Wide Web; it provides interoperability between applications that exchange machine-understandable information on the web. The broad goal of RDF is to define a mechanism for describing resources that makes no assumptions about a particular application domain, nor defines the semantics of any application domain. RDF relies on the support of XML (extensible markup language) and its model resembles an entity-relationship diagram. In object-oriented design terminology, resources correspond to objects and properties correspond to instance variables. To facilitate the definition of metadata, RDF represents a class system much like object-oriented programming and modeling systems. A collection of classes is called a schema. Schemas may themselves be written in RDF.

Representation of "data about data" (metadata) to achieve application independent interoperable solutions carries the basic similarity between relational databases and RDF. However, RDF does not carry facilities for specifying queries making use of metadata, so far possible in a relational database. Query capabilities enable users to construct arbitrary types of data on the fly for application processing logic to apply. Additionally, relational databases are having advanced capabilities in universal servers to specify application interfaces embedded inside SQL query expressions to represent operations or methods to apply over constructed data. Such important possibilities are also missing from RDF. Lack of such facilities is the limitation of RDF to address evolving electronic business needs in its completeness.

Relational algebra incorporates algebraic operations like join, select, project, union, intersection etc. Such operations are expressed in queries against a relational schema. As opposed to this scenario, web entities are accessed by navigation through Uniform Resource Identifiers (URIs). An amalgamation of these two paradigms is the desired goal to achieve in electronic business. Relational operations over RDF definitions for resources and their attributes are possible exploiting relationships over resources and structured property values and normalizing them in a back end relational database. Queries involving join, select, project and other relational operations can be effectively used to extract desired values and properties of resources. Without such a mechanism, web surfing in conjunction with complex automated business to business services and transactions are not possible.

Electronic commerce and services have introduced many new ways of trading allowing interaction between groups that previously could not economically afford to trade among one another. Whereas previously commercial data interchange involved mainly the movement of data fields from one computer to another, the new model for web-based commerce and services is typically dependent on intelligent processing and interactions for the transactions to take place. This involves understanding and specifying business concepts represented in the interchanged data and subsequent application of business-specific rules or methods to the interchanged data. Transactional and query facilities with embedded method interfaces can lead to such a powerful scheme. Query specifications with embedded interfaces are currently present in object relational databases or universal servers. Object relational databases with business logic bound inside the server offer distinct directions for resolving similar complex issues over XML/RDF definitions and Java classes. Transactional and query facilities to an object relational database are possible through thin client windows incorporating a persistent connectivity with the database. Persistent connectivity to a database system is not possible in a simple browser for stateless web navigation.

XML/RDF documents are interchanged based upon HTTP (Hypertext transfer protocol) which is different from IIOP (Internet inter ORB protocol). HTTP is the main communication mechanism among web browsers and servers. It is a stateless protocol implying that there is no way for the client and the server to know each others state. Since web is stateless, each transaction consumes time and resources in the setup and closing of network and database connections. For large transaction processing applications, this overhead will be significant. Internet inter ORB protocol (IIOP) is a dynamic invocation interface for the web. This protocol maintains the session between the client and the server objects until either side disconnects. It provides persistent connectivity over the web for distributed objects. The OMG (Object Management Group with web address http://www.omg.org) is an industry consortium to create a component based software marketplace by establishing industry guidelines and detailed object management specifications to provide a common framework for application development. Common Object Request Broker Architecture (CORBA) from OMG specifies the Object Request Broker (ORB) that allows applications and programs to communicate with one another no matter where they reside on the web. The IIOP specification defines a set of data formatting rules, called CDR (Common Data Representation) which is tailored to the data types supported in the CORBA interface definition language (IDL). Electronic business transactions and query servers implementing structured query language (SQL) processing engine require internet protocols for document transfers as well as object executions with persistent connectivity over the web. As a result, such an engine must build on top of both HTTP and IIOP. Traditional browsers for navigation need to be augmented with additional capabilities for occasional creation, maintenance and destruction of one or more client windows interfacing databases over the web for transactions and collaborations. These windows require IIOP for persistent connectivity.

A database schema can be partitioned over the web in such a way that disparate business logic and business objects can exist with relevant data and views over the web. Unifying the object paradigm and relational model paradigm is the mainstream effort across the industry. Unified model for distributed relational databases integrated with object model is the key to many storage and manipulation issues for the electronic business. Universal relational database servers are available from different database vendors to offer general extensibility and features for electronic business. One can extend types of attributes in tables and integrate routines defined by users written in high level programming languages. Such products offer the facilities of user-defined routines and packages. A user-defined routine (UDR) is a routine that a user creates and registers in the system catalog tables and that is invoked within a SQL statement or another routine. A function is a routine that optionally accepts a set of arguments and returns a set of values. A function can be used in SQL expressions. A procedure is a routine that optionally accepts a set of arguments and does not return any values. A procedure cannot be used in SQL expressions because it does not return a value. An UDR can be either a function or a procedure. The ability to integrate userdefined routines, packages and functions within SQL is the extensibility feature offered by universal servers and such features are useful for electronic business.

Uniform Resource Identifiers are frequently embedded in XML and HTML pages where a browser can navigate through a resource identifier to find and manipulate web objects. A resource can also identify an object relational schema component over the web. RDF documents represent metadata that could be directly derived from one or more object relational database(s). Information existing inside object relational databases presented in XML/RDF definitions makes an information hierarchy over the web that should be seamlessly navigated and queried. This kind of seamless interoperability can prove to be very valuable in electronic business and commerce. However, these possibilities are not present in current state of the art.

As described above, there is a clear need in the art for automated web functionality in electronic business over the information stored and exchanged across the internet, requiring (a) to support a generic execution model for arbitrary type construction from XML/RDF definitions followed by business logic execution anywhere on the web, (b) to support uniform object SQL query facilities over a single virtual database unifying multiple object relational databases viewed by related XML/RDF documents and (c) to support uniform navigational as well as transactional facilities over data and metadata definitions extending capabilities in traditional browsers for occasional creation and maintenance of thin client windows for persistent connectivity with remote databases. There are further needs in XML/RDF processing framework to unify and support various techniques for buyer/seller relationships in electronic commerce, (a) by allowing navigation through web pages (XML/RDF definitions) for inspecting and implicitly generating object SQL queries, (b) by executing such queries in one or more object relational engines over the internet to generate further web pages (XML/RDF definitions) with more accurate or elaborate information, (c) by seamlessly repeating such processes described in (a) and (b) if necessary and (d) by performing transactions on focused data items anywhere on the web.

SUMMARY OF THE INVENTION

The present invention solves the aforementioned deficiencies of the prior art and solves other problems that will be understood and appreciated by those skilled in the art upon reading and understanding the present specification. It is a primary objective of the present invention to provide a mechanism in Extensible Markup Language (XML) and Resource Description Framework (RDF) for representing and navigating higher level specifications for data/metadata and for constructing arbitrary types by SQL queries with embedded method interfaces. Specifications for SQL queries with embedded business application logic could be either represented in XML/RDF documents or such queries for transactions could be triggered through thin client windows communicating persistently with remote databases. These object SQL queries apply uniformly to one or more object relational databases over the web to manipulate data and to construct further XML/RDF documents for navigation and inspection. This way, a uniform paradigm for navigation through Uniform Resource Identifiers within XML/RDF documents and querying one or more object relational schema components identified seamlessly by Uniform Resource Identifiers over the web will evolve, thereby addressing various needs in electronic business and commerce.

In one embodiment of the invention, a virtual unified Database over multiple object relational databases over the web is described. Application business logic, messaging services and object request brokers reside inside an object relational database server eliminating the need for a middle tier. Uniform Resource Identifiers are stored in table columns of relational databases as locators of elements inside component relational schema with Java classes distributed over the net. Java classes encapsulate or package business logic to be applied on relational data or other multimedia data. Types defined by users to represent attributes in tables involve packaged object definitions to encapsulate methods or operations. These operations are applied through Object Request Brokers. In this invention, user-defined package contains interface definitions (call specifications) where an explicit mapping of data item types to tables and attributes are made to ensure safe environment of method application. Such definitions of interfaces inside packages are used to apply methods over records constructed by relational operations and these interfaces are embedded within object SQL queries. These interfaces are implemented as methods in Java classes with appropriate mappings to Java argument types. Therefor a uniform paradigm for multi-tier client/server without a middle tier application server is presented.

In another embodiment, XML/RDF definitions to represent data and metadata are mapped to relational descriptions for records and their relationships through foreign keys and primary keys. Uniform Resource Identifiers are unique identifiers for entities over the web and in this invention these identifiers are used as primary key and foreign key values in a relational model of description. A relationship expressed in RDF description of resources can be directly mapped to the primary key/foreign key relationship of records in a relational database. A collection of resources is defined by RDF container types; namely Bag, Sequence and Alternative. These container types can be normalized into proper foreign key and primary key relationships so that SQL queries involving join and other operators may be able to construct records with defined container relationships. Multi-part primary keys for sequences and different normal forms in relational model capture various semantics possible in RDF data/metadata definitions. Thus multiple related XML/RDF documents distributed over the web are mapped to data and metadata in multiple related object relational databases for object SQL queries to fetch and manipulate information.

In another embodiment, method interfaces are represented as virtual attributes with specifications for parameters as resources and collection of resources. Definitions for methods are given in XML namespace schema definition. This invention further extends the scope of representing SQL queries in XML/RDF specifications by defining XML namespace for relational operator definitions. All the key words in SQL are defined in namespace with respective meanings. SQL queries are implicitly constructed from sets of XML/RDF definitions in semantically related documents. This invention further represents object SQL queries by having method interfaces embedded within queries in XML/RDF format. This way a specific XML/RDF document can be carrying an object SQL query for execution within one or more object relational schema components over the web.

In yet another embodiment, XML/RDF documents with data/metadata definitions constitute views over databases. A part of a database or union over several databases can be viewed by a document. All database updates are viewed by generating new documents replacing old ones. A view or a union over views or a full database can be updated by creating client windows maintaining persistent links through object brokers. Such windows are maintained as long as transactions persist. Transactions over views or a database cannot be done without such a client window. Only read-only implicit queries are allowed without such client windows. Object SQL queries uniformly manipulate local and/or remote database table, attributes and objects. Querying and viewing multiple object relational schema components over the web can also include legacy and other large existing database systems.

BRIEF DESCRIPTION OF THE DRAWINGS

FIG. 7(a) shows an excerpt from a Resource Description Framework script with the corresponding entity-relationship diagram suitable for use with the present invention.

FIG. 8(b) shows relational representation of the information described in FIG. 8(a) in accordance with the present invention.

FIG. 9(b) shows relational representation of the information described in FIG. 9(a) in accordance with the present invention.

FIG. 10(b) shows relational representation of the information described in FIG. 10(a) in accordance with the present invention.

FIG. 12 shows a diagram and an excerpt from a RDF script describing method definition over SEQ container in accordance with the present invention.

FIG. 14 shows an excerpt from a RDF script representing a query in Structured Query Language (SQL) in accordance with the present invention.

FIG. 15 shows a diagram and an excerpt from a RDF script representing an object SQL query with embedded method interface in accordance with the present invention.

DESCRIPTION OF THE PREFERRED EMBODIMENT

Figure 1:
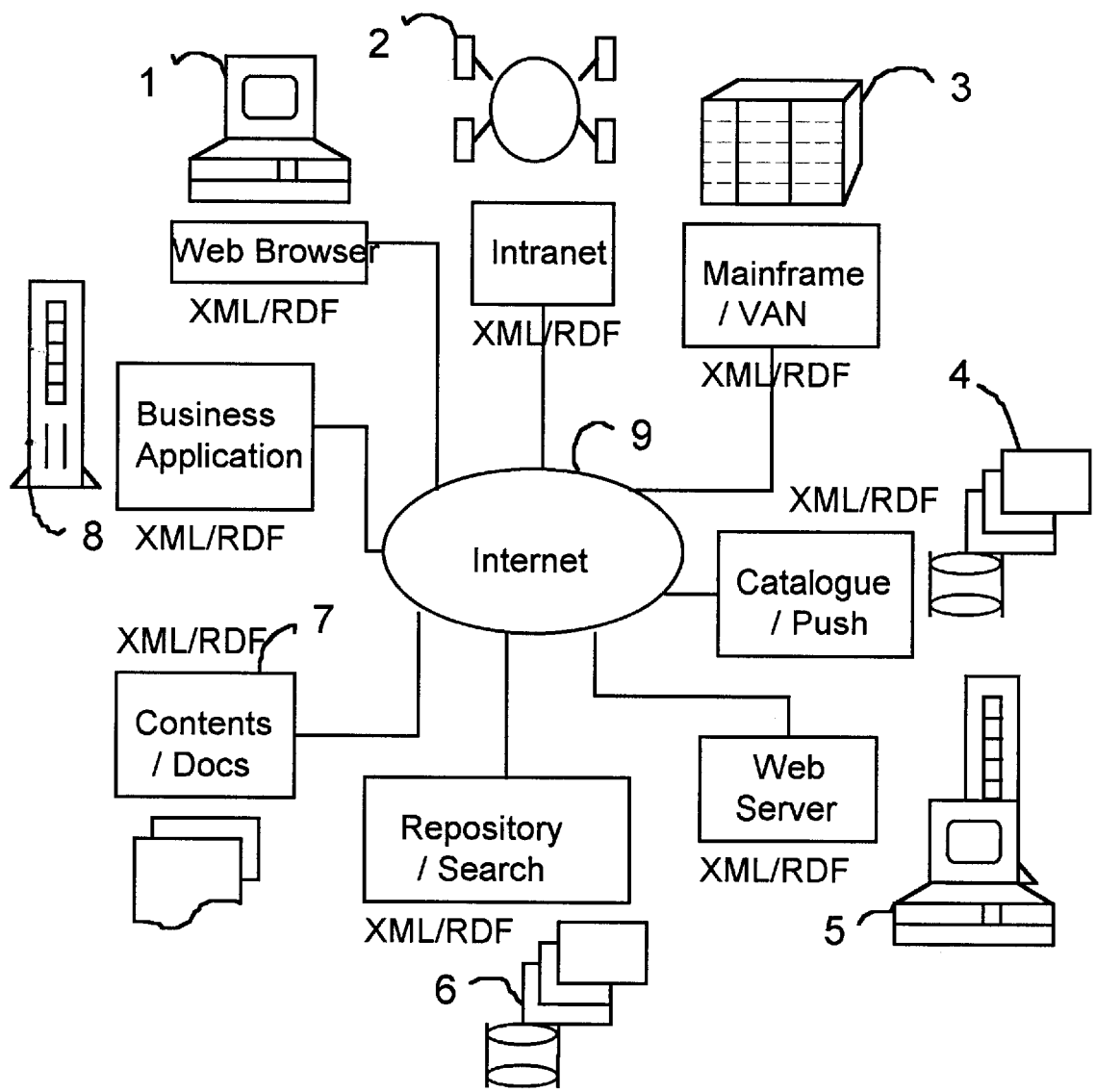
FIG. 1 is a diagram illustrating various information sources over the internet relevant to the present invention.

The present invention will be explained in detail by way of a preferred embodiment thereof in conjunction with accompanying drawings herewith. Referring first to FIG. 1, there is shown heterogeneous information sources connected over the internet for electronic commerce and electronic business.

Suitable computers may communicate directly through modems over a telephone line or other direct "wire" communication links. Suitable computers for electronic business may reside on a computer network such as a local network, a value-added network, and the internet. The "internet" as used herein includes variations such as private Internet, secure Internet or intranet. The computers may be workstations, laptop computers, mobile disconnected computers, database servers or a combination thereof. In FIG. 1, one such internet connection suited for use with the present invention is indicated by 9. The internet 9 includes an intranet 2, a value-added network 3 with mainframes, a location 4 for e-commerce catalogues. It also includes a web server 5, a location 6 for general repository, a location 7 for documents with general contents, a web site 8 for business applications and general client location 1 with web browser. Web browser 1 enables a client to interact with any information source over the internet. For example, a client can use 1 to access a remote transactional system 8, which may be directly linked to underlying core enterprise application. The end result of such an interaction may require that the transaction results be re-entered into client's own business systems. The goal of system-to-system interaction remains primarily the domain of XML and RDF. Information to and from 8 is represented in XML and RDF format to represent context, meaning and relationships over data elements so that a program or an agent can operate on the data without human intervention.

Seamless interaction and automatic transfer of content between disparate web sites carrying various contents are essential for electronic commerce and electronic business. The location for catalogues at 4 in FIG. 1 generates information that could be replicated by tens, hundreds or even thousands of sites. Automatic updates of information between these sites can be accomplished by using XML and RDF. Ensuring that all information in the marketplace is consistent across all partner channels is critical for electronic commerce. Web sites could be strategically linked to develop a hierarchy for the replicated data. Locations 6 and 7 in FIG. 1 provide searchable repositories and hierarchy of XML documents for such purposes. Non-web applications extracting and using data stored in web-based documents are now increasingly becoming important as major companies embrace on-line catalogues as a primary means of product information distribution and sales. By allowing purchasing applications to understand the context of the remote web based catalogues, searching and order placement can be done automatically. Location 8 in FIG. 1 interacts with 7, 4, 6 and 5 for such applications to automatically integrate by using XML and RDF. The widespread embrace of enterprise resource planning systems represents the first step in automating the enterprise, but linking those systems with trading partners outside of the corporate firewall remains a challenge. In FIG. 1, intranet 2 supports exchange of application-to-application information locally within a company. Application integration using XML/RDF works both for intra-company and inter-company, including legacy systems as well. A value-added network (VAN) involving mainframe represents legacy systems and applications thereof at 3. By using XML and RDF, 2 and 3 can communicate with each other along with all other sources 8,7,6,5 and 4 via the internet.

Figure 2:
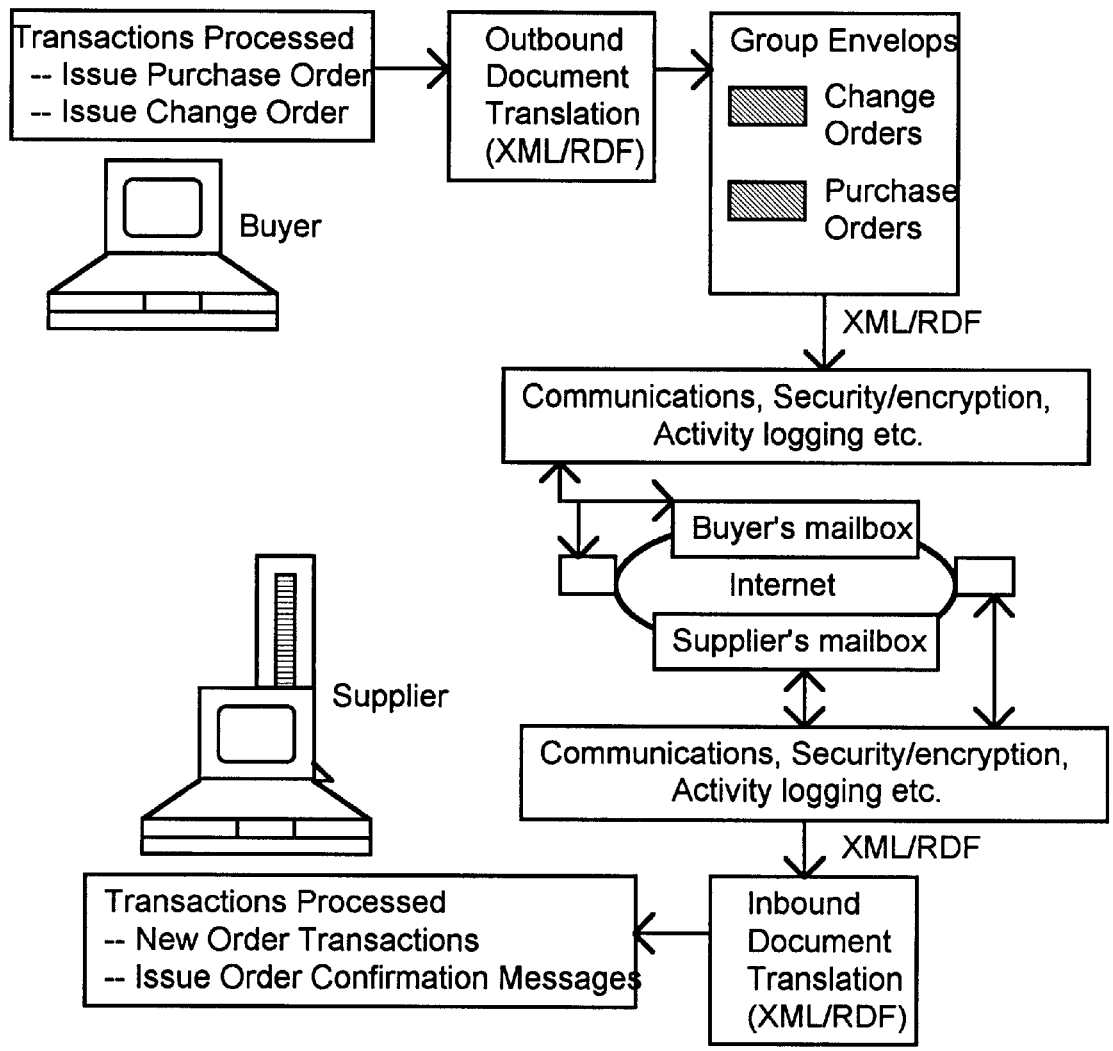
FIG. 2 is a diagram illustrating buyers/suppliers in an extended supply chain over the internet relevant to the present invention.

In FIG. 2 an extended supply chain is shown. In the block diagram, a buyer and a supplier are shown to exchange information over the internet. In reality, however, there may be hundreds or thousands of customers and trading partners over the internet leading to many-to-many interrelationships and complex information exchange. In the simplified buyer/supplier interaction shown in FIG. 2, a purchase order and a change order are shown as issued at the buyer's end. These are generated after transaction processing over the enterprise resource planning systems at buyer's internal business systems. The use of XML and RDF for application integration enables system-to-system inter-operations within the enterprise. In FIG. 2, XML/RDF documents are generated from already issued purchase order and change order at outbound document translation stage. These documents are grouped according to need and desired actions at the next stage. Fourth stage in the diagram shows a messaging infrastructure that manages communication, security/encryption, activity logs, etc., at the buyer's end of the supply chain. This messaging infrastructure may include a Common Object Request Broker Architecture (CORBA) messaging service and a complete XML/RDF based integration server with message manager. On the supplier's end in FIG. 2, there exists a similar messaging infrastructure stage and an inbound document translation stage to perform the inverse operation on XML/RDF documents for understanding specified requests from the buyer. New order transactions are processed at a further stage of supplier's enterprise resource planning systems and subsequently order confirmation messages generated for sending back to the buyer. Requests from the buyer are sent to supplier's mailbox and confirmation message is sent back to buyer's mailbox. Such transactions between trading partners can, however, be automatic.

The relationship established between two trading partners in FIG. 2 shows possibilities for automated application-to-application integration using XML/RDF based integration middleware and CORBA based middleware. The same middleware could be used to integrate the front office and back office applications within an enterprise. Internet applications and web based application-to-application integration infrastructure follow a multi-tier architecture over the web for integrating business processes and database servers using XML/RDF and CORBA based middleware.

Figure 3:
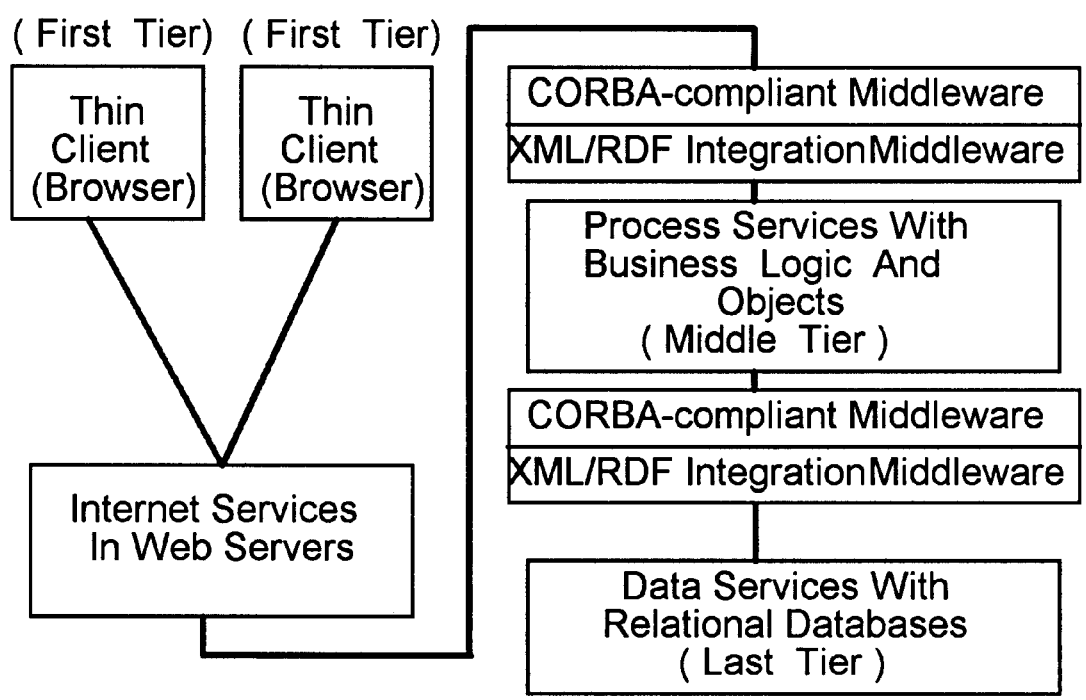
FIG. 3 is a block diagram showing different stages in multi-tier client/server architecture over the internet in accordance with the invention.

FIG. 3 shows multi-tier architecture for web applications. First tier in this architecture is a browser on the client site. A client needs very little software on the client computer. Any command or request for a service goes to a web server for internet services as shown in the figure. Internet services are usually dealing with HTTP (hypertext transfer protocol) to communicate with various web sites. Web servers talk to application servers where business-specific application logic is maintained. A fat client may talk directly to an application server. Request to application servers is made through a messaging middleware comprising of XML/RDF integration services and Common Object Request Broker Architecture (CORBA) compliant services. Two disparate application servers can also communicate through middleware utilizing CORBA and XML/RDF integration services. Hyper Text Transfer Protocol and the internet are synchronous by nature. When certain application server contacts another using HTTP there is a direct link established that is not broken until all information has been transferred. This may not be the situation for other protocols and messaging services. Object request brokers (ORB) create a persistent link between web server and application server for servicing object requests by the use of IIOP (Internet Inter ORB Protocol). Application server talks through either XML/RDF integration services or CORBA services to communicate with third tier databases for executing SQL queries and other database services as shown in FIG. 3.

Recent development of universal servers and object relational database servers enhances the capability of relational database servers by putting application business logic, messaging services and object brokers inside the relational database server and thereby eliminating the middle tier. This invention is based on a similar notion.

Figure 4:
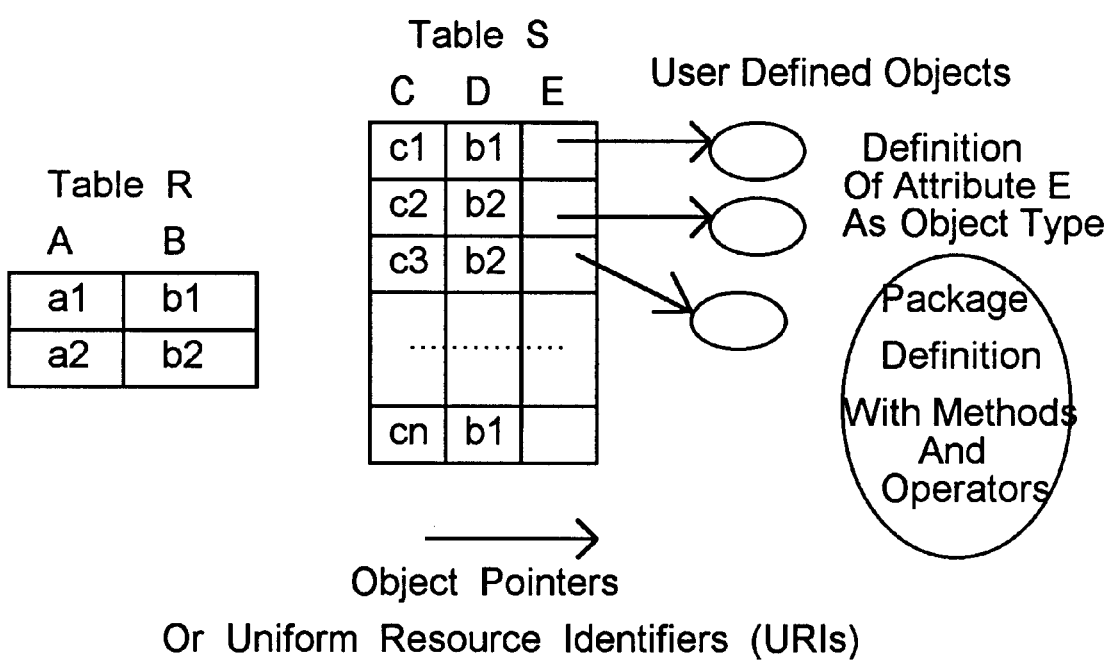
FIG. 4 is an object relational database containing tables with foreign key relationship and user-defined type definitions as focused in the invention.

A schema in a typical universal server or object relational server is shown in FIG. 4 where two tables are defined as R (A, B) and S (C, D, E). Table S inherits the primary key B from R as foreign key in attribute D. Attribute E of table S is a non-simple type defined by the user. These user-defined types are usually associated with an object or package containing method and operator definitions. Example of such a user-defined type in one of the available universal servers is given below.

```
CREATE TYPE OrderType AS OBJECT
(      OrderId       number,
       LineItems     LineItemSetType,
       MEMBER FUNCTION TotalValue( )
                          RETURNS number,
       MAP FUNCTION MapOrder( )
                          RETURNS number      );
```

In the above definition, functions TotalValue() and MapOrder() are operations defined on data of the type OrderType. One can define a table using the type as shown below.

```
CREATE TABLE PurchaseOrder
(    POnumber  number,
     POrder    OrderType  );
```

SQL query over the table PurchaseOrder may look like the following example.

```
SELET P.POrder.TotalValue( )
FROM PurchaseOrder P;
```

Syntax for creating user-defined type with methods and operators varies from product to product. In another universal server the syntax is as following.

```
CREATE ROW TYPE Claim
(    Claim_Seq   INTEGER,
     Claim_Id    User_Type_Cid );
CREATE OPAQUE TYPE User_Type_Cid
(    INTERNALLENGTH = VARIABLE,
     MAXLEN=80    );
CREATE FUNCTION lessthan
     (User_Type_Cid, User_TypeCid)
     RETURNS boolean
     EXTERNAL NAME
     'btree.so (User_Type_Cid_lessthan)'
     LANGUAGE C NOT VARIANT ;
CREATE FUNCTION equal
     (User_Type_Cid, User_TypeCid)
     RETURNS boolean
     EXTERNAL NAME
     'btree.so (User_Type_Cid_equal)'
     LANGUAGE C NOT VARIANT ;
```

There are many such method and operator definitions in the form of functions over the type. The second syntax described above encodes a function name, parameters to the function, return type for the function, external location and external name for the function etc. External name/location specifies the software object containing the function implementation.

This invention uses Java language to implement such user-defined packages with methods and operators. Java is a popular object oriented language for programming over internet where one can specify classes, inheritance, methods, constructors and operators. Currently, almost all the database vendors are supporting Java language inside object relational servers. This invention specifies in a 'CREATE type' definition, the name for a Java class which implements a set of functions as methods and operators for that type.

In one of the popular object relational database products, Java classes are defined and loaded in database server and further these are published for safe use in SQL queries. Before calling Java methods from SQL, it is necessary to publish them in the corresponding data dictionary where all the metadata definitions are stored. To publish the methods, one must write call specifications (call specs), which map Java method names, parameter types, and return types to their SQL counterparts. For a given Java method, a function or procedure call spec is declared using the SQL 'CREATE FUNCTION' or 'CREATE PROCEDURE' Statements. Similar declarations are used in a PACKAGE definition or SQL object type definition.

A package spec for methods addDept( ), drop_dept( ) and change_dept( ) is created as follows:

CREATE OR REPLACE PACKAGE dept_mgmt AS
    PROCEDURE add_dept (dept_name VARCHAR2, dept_loc VARCHAR2);
    PROCEDURE drop_dept (dept_id NUMBER);
    PROCEDURE change_loc (dept_id NUMBER, new_loc VARCHAR2);
END dept_mgmt;
Then the package body is created by writing call specs for the Java methods:
CREATE OR REPLACE PACKAGE BODY dept_mgmt AS
    PROCEDURE add_dept (dept_name VARCHAR2, dept_loc VARCHAR2)
    AS LANGUAGE JAVA
    NAME 'DeptManager.addDept(java.lang.String, java.lang.String)';
    PROCEDURE drop_dept (dept_id NUMBER)
    AS LANGUAGE JAVA
    NAME 'DeptManager.dropDept(int)';
    PROCEDURE change_loc (dep_id NUMBER, new_loc VARCHAR2)
    AS LANGUAGE JAVA
    NAME 'DeptManager.changeLoc(int,java.lang.String)';
END dept_mgmt;

In the above example, methods for adding a new department, dropping an existing department and changing location of a department are defined in a Java class DeptManager and these methods are published in their corresponding call specifications within package definition dept_mgmt. The Java types are mapped to SQL types. For example, java.lang.string is a type in Java language that maps to SQL type varchar2.

This invention extends the notion of methods in an object relational server by describing more complex type relationships in a package and a call specification. The types used in an object relational database engine to map types in Java language environment are mostly standard ones. For example, DATE is a built-in type in SQL that can map to one of the following Java language types: java.sql.Data, java.sql.Time, java.sql.Timestamp, java.lang.String. Similarly, there are other SQL types like CHAR, VARCHAR2, RAW, ROWID etc, which are also mapped to Java language types. However, these mappings are semantically inadequate in object relational databases because tables resulting from normalization in a relational database are not considered as types to map. A relational database undergoes a process of successive normalization to derive a set of flat relations from a single nested scheme. These normalized relations are then stored as tables with foreign key/primary key relationships. A business operation or method is applied to data sets resulting from SQL queries over a relational database. Such SQL queries perform join and other relational operations over multiple tables to produce a final result set. Therefore, a method or operation is applied to a set of data items coming from different tables in a relational database. Such data item types defined within method interfaces should have an explicit mapping to these tables and attributes to ensure safe environment for method application. Previous example of package definition with call specifications is targeted to a single relation or table, namely Department. A more general example of package definition reflecting the purpose of the invention is described below.

A database is considered with at least two tables Department and Employee having foreign key/primary key relationships. A set of methods is defined to operate on data items resulting from join over Department and Employee tables. First method is Find_Manager_of_emp( ) which checks if an employee has a specific department manager passed as argument to the function. Second method is Get_Dept_loc_for_emp( ) which returns location for department of an employee. Method implementations are done in Java class EmpInfo.

```
CREATE OR REPLACE PACKAGE emp_dept_info AS
    FUNCTION Find_manager_of_emp (manager_name
        Department.manager_name, empid Employee.emp_
        id)
        RETURN NUBER;
    FUNCTION Get_Dept_loc_for_emp (emp_id
        Employee.emp_id)
        RETURN VARCHAR2;
END emp_dept_info;
CREATE OR REPLACE PACKAGE BODY emp_dept_
    info AS
    FUNCTION Find_manager_of_emp (manager_name
        Department.manager_name,    emp_id
        Employee.emp_id)
        RETURN NUMBER
        AS LANGUAGE JAVA
        NAME 'EmpInfo. Find_manager_of_emp
            (java.lang.String, int) return int';
    FUNCTION Get_Dept_loc_for_emp (emp_id
        Employee.emp_id)
        RETURN VARCHAR2
        AS LANGUAGE JAVA
        NAME 'EmpInfo. Get_Dept_loc_for_emp (int)
            return java.lang.String';
END emp_dept_info;
```

In the above package definition with call specifications, arguments to function interfaces are explicitly declared as attribute types of Department and Employee tables. The advantage of such an explicit declaration is to ensure that a safe and correct method of execution requires a join to be taken over Department and Employee tables for retrieving necessary data items. This invention incorporates explicit declarations to bind Java class definitions with SQL construction of record types in a unique way to reflect object relational characteristics.

Figure 5:
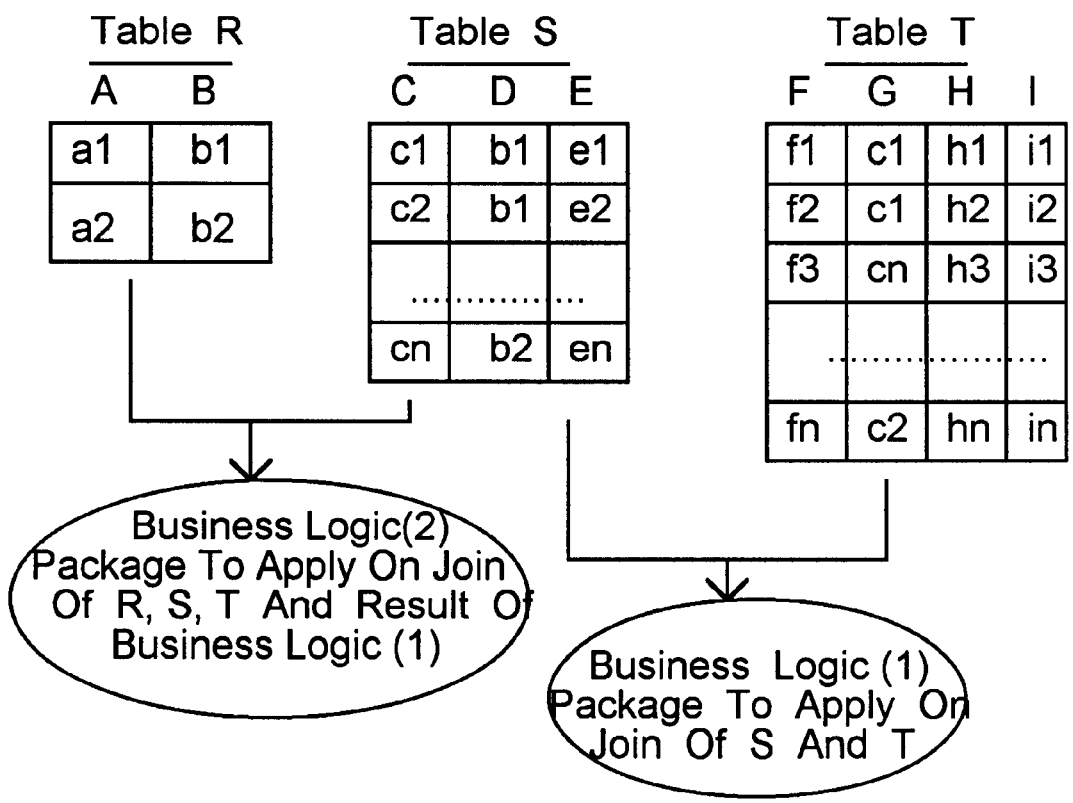
FIG. 5 shows an object relational database schema definition with tables and business logic package descriptions in accordance with the invention.

FIG. 5 shows a diagram of a relational database schema which contains three tables R(A, B), S(C, D, E) and T(F, G, H, I) where attribute D in table S is a foreign key inherited from table R referencing primary key B in R and attribute G in table T is a foreign key inherited from table S referencing primary key C in table S. A query over these three tables involves relational operations constructing different types of record sets. An application program written for a specific business is a processing logic or business logic over such record sets constructed by relational queries. Certain business logic can embed another business logic over a subset of records constructed by queries. In FIG. 5, business logic (1) is applied to a result of join operation over tables S and T. Business logic (2) is applied over a join of all three tables along with nested application of business logic (1). Example package definitions for business logic (1) and (2) are given below.

```
CREATE OR REPLACE PACKAGE business_logic_2 AS
    FUNCTION function_interface_1 (argument1 R.A,
        argument2 business_logic_1.function_interface_1
        (S.E, T.H))
        RETURN NUMBER;
    ...............
    ...............
END business_logic_2;
CREATE OR REPLACE PACKAGE BODY business_
    logic_2 AS
    FUNCTION function_interface_1 (argument1 R.A,
        argument2 business_logic_1.function_interface_1
        (arg1 S.E, arg2 T.H))
        RETURN NUMBER
        AS LANGUAGE JAVA
        NAME 'business_logic_2_class. Function_
            interface_1 (java.lang.String, int) return int';
    ...............
    ...............
END business_logic_2;
```

In the package definition shown above, only one function interface and call specification is defined to illustrate the nested interfaces. The package for business_logic_2 contains a function interface function_interface_1 consisting of two arguments. The first argument is an attribute in relation R and the second argument is a function interface from package definition business_logic_1 (given below). This embedded interface definition contains two arguments mapped to two attributes from relations S and T respectively. The interface definition for business_logic_2 implies that join operations are required over the relations R, S and T before the desired attributes are extracted for passing as input arguments. The package definition for business_logic_1 is shown below.

```
CREATE OR REPLACE PACKAGE business_logic_1 AS
    FUNCTION function_interface_1 (argument1 S.E,
        argument2 T.H)
        RETURN NUMBER;
    ...............
END business_logic_1;
CREATE OR REPLACE PACKAGE BODY business_
    logic_1 AS
    FUNCTION function_interface_1 (argument1 S.E,
        argument2 T.H)
        RETURN NUMBER
        AS LANGUAGE JAVA
        NAME        'business_logic_1_class.
            Functioninterface_1 (java.lang.String, int) return
            int';
    ...............
END business_logic_1;
```

The package definition for business_logic_1 contains only one representative interface function_interface_1 that has two arguments mapped to attributes from relations S and T respectively in FIG. 5. The packages are implemented by Java classes, namely business_logic_2_class and business_logic_1_class respectively. In the Java method interface 'business_logic_2_class.function_interface_1( )', it is not required to capture the nesting of interfaces as is done in the package definitions. This invention captures the semantics of nested application of methods in published package definitions only. When these published interfaces are used inside object SQL queries, SQL processor ensures that the proper nesting in function applications with correct argument types are in place. These interfaces embedded in object SQL queries are then mapped to corresponding Java classes and methods. An example object SQL query is given below.

```
SELECT business_logic_2.function_interface=hd
    —1(R.A, func_result)
    FROM R, S, T
```

WHERE
  R.B=S.D
  AND S.C=T.G
  AND func_result=business_logic_1.function_
    interface_1 ( S.E, T.H )
  AND func_result>1000;

In the above example of object SQL query, calls are made to interfaces from packages described earlier. Corresponding Java classes are constructed with the data sets resulting from SQL execution before methods are applied. This invention uniquely combines data set constructions by SQL execution with Java class instance constructions prior to method invocations.

This invention further extends the idea described above by using Uniform Resource Identifiers (URIs) to represent schema components carrying package and table definitions. Uniform Resource Identifier (URI) can be thought of as a networked extension of the standard filename concept where one can point to a file name in a directory on any machine on the internet. URIs point to queries, documents stored deep within databases etc. An example file URI in a typical FTP server is shown below.

file://ftp.servername.com/files/name.txt

URIs pointing to Usenet newsgroup (say, "rec.gardening") is shown below.

News://news.servername.com/rec.gardening

A file called "foo.html" on HTTP (Hyper Text Transfer Protocol) server in directory "/files" corresponds to this URI.

http://www.servername.com/files/foo.html

This invention uses the notion of URI to point to a database schema on the internet and a table (which may also be a virtual table or a view) belonging to that schema. Syntax for such URI is shown below.

Rdms://www.servername.com/SchemaName

This URI signifies a relational database management system on the World Wide Web at the specified server. SchemaName is the name of the schema created and maintained under the database on the server. Following the SchemaName in the URI, one can add a table or a view name or a query to retrieve or update data.

Figure 6:
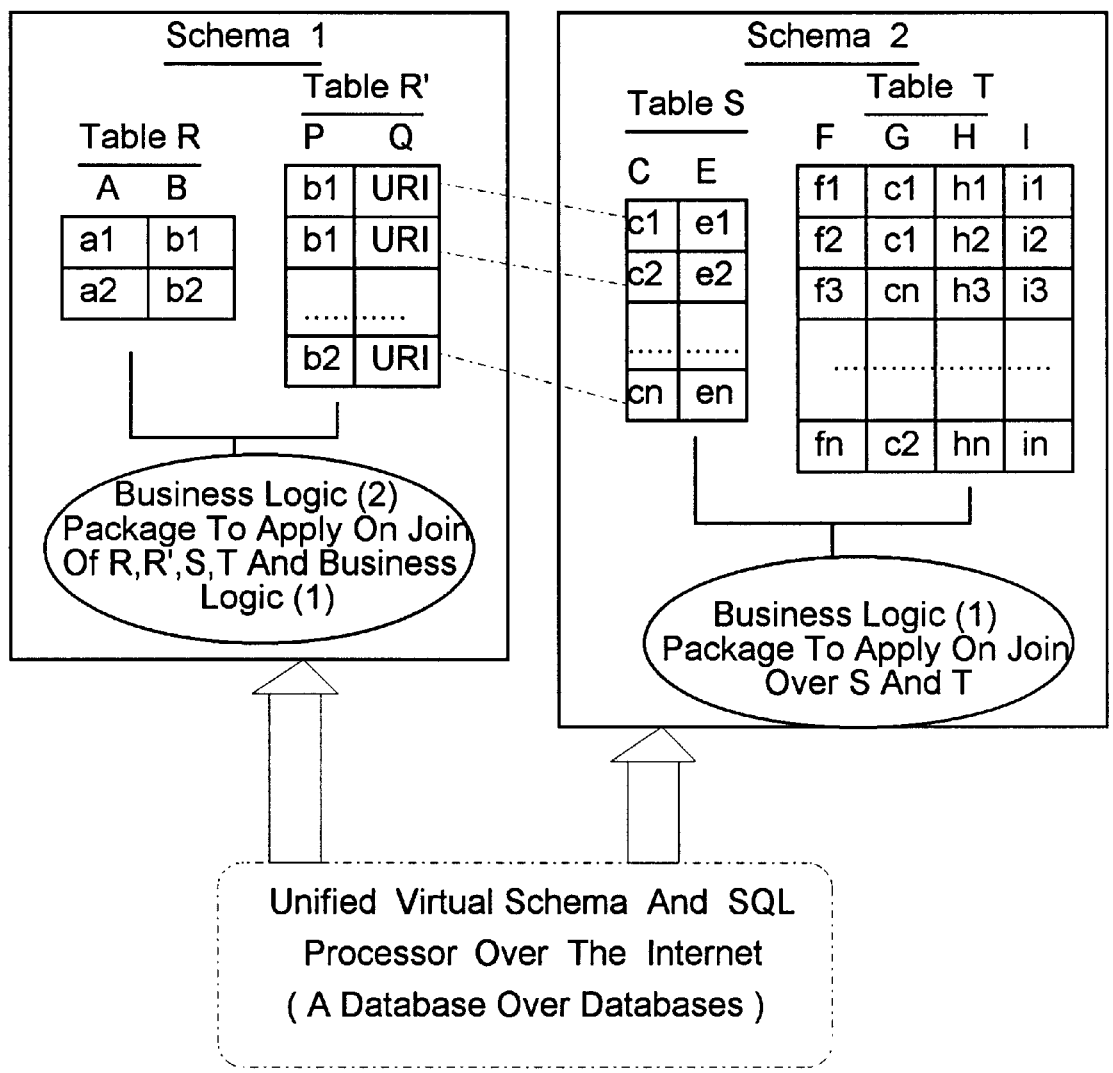
FIG. 6 shows two relational database schema definitions with business logic and uniform resource identifier links along with a unified virtual schema for seamless object SQL processing in accordance with the invention.

FIG. 6 shows a partitioning of the schema in FIG. 5. Schema 1 and Schema 2 are two separate definitions based on the business logic to apply on constructed record sets. Schema 1 contains two tables R(A, B) and R'(P, Q) R(A, B) is the same table R in FIG. 5. R'(P, Q) is a new table where P is a foreign key inherited from table R referencing its primary key B and Q is URI of records in table S in Schema 2. Table S(C, D, E) in FIG. 5 is partitioned into two tables R'(P, Q) and S(C, E) and placed in Schema 1 and 2 respectively in FIG. 6. Attribute Q in table R' acts as the URI for the primary key attribute C of table S(C, E) in schema 2. Separation of schema 1 and schema 2 distributes the application program component executions. The business logic (2) in schema 1 is applied in steps, first on a join over tables R and R' to do partial computation and to get the URIs in attribute Q. Then these URIs are sent to schema 2 to select the records corresponding to the primary keys in table S followed by a join with table T. After that business logic (1) is applied over the resulting record set and the result is sent back to schema 1 for completion of processing of business logic (2). A single schema in FIG. 5 needs both business logic (1) and (2) to be maintained and executed at the same location on the net. FIG. 6 shows how a distributed execution model can evolve by partitioning the schema. Such a distributed computing environment is a fundamental requirement for a multi-tier client/server model over the internet.

The package definitions described with respect to FIG. 5 are now separately located in two different schema in FIG. 6. Package definition business_logic_2 is located in schema 1 and uses interfaces of business_logic_1 that exists in schema 2. The interface definition of business_logic_1 is published in data dictionary of schema 1 as a remote package entity with associated URI for the location of schema 2. Complete package definition for business_logic_1 exists in schema 2. During execution of methods in business_logic_2, calls to methods in business_logic_1 are made through Object Request Broker (ORB) in a Common Object Request Broker Architecture. Arguments to interfaces in business_logic_1 are table and attribute definitions in schema 2 whereas arguments to interfaces in business_logic_2 involve tables and attributes of schema 1 along with embedded interfaces from schema 2. Execution of methods in business_logic_2 requires multi-table join operation over tables R, R', S and T in both schema definitions. The execution consists of stages: (a) taking join over R and R' in schema 1, (b) sending result sets of records or sets of URIs to location of schema 2, (c) joining incoming sets of URIs with S and then T to get final sets of records for method applications in business_logic_1 and (d) sending the necessary results back to location of schema 1 for further method applications. This collaborative join processing across distributed schema locations is performed prior to collaborative method executions through Object Request Brokers.

In FIG. 6, further illustration of a unified schema and SQL processor is shown over two component schema definitions. Virtual unified schema is a union over definitions in schema 1 and schema 2. Object SQL queries are seamlessly made over such a virtual unified schema representing a single database consisting of multiple physical databases over the internet. SQL processing over multiple object relational schema components over the internet can be distinctly divided into two separate stages of processing. Stage (1) of processing would resolve metadata definitions from disparate schema components to decompose an object SQL query into separate components for stage (2) of executions in physical databases. Collaborations are accomplished by stage (1) of SQL computations by (a) sending proper sets of records to remote schema locations, (b) receiving resulting records from remote schema locations, (c) creating temporary tables in local database for storing record sets received and (d) triggering necessary SQL components to perform join over record sets from local and remote databases. Stage (1) of SQL computations can be seen as non-local phases of data and metadata recognition, preparations, communications and resolutions whereas stage (2) of SQL computations are exclusive execution phases local to a physical schema component. These two stages may or may not be distinctly separated. According to this invention, these two stages are, however, distinctly divided into two separate SQL engines where the upper level stage (1) SQL engine makes calls to disparate local stage (2) SQL engines through callable interfaces. Top level SQL engine represents a virtual global database containing many disparate physical databases over the web and also having access to internet directory information. This invention uniquely defines a new concept for a Database over Databases, which is not currently present in the industry. Each disparate physical database needs to exist with a layer of stage (1) object SQL processing software for such a unified paradigm.

This invention further extends the scope by relating XML/RDF definitions to represent data, metadata and object SQL queries for such a unified schema over distributed object relational database components. XML/RDF definitions embrace description of resources and their properties. Unlike currently known web page navigation through URIs, it is also possible to navigate using predicates on properties and other specifications on containment relationships over resources. Such specifications would translate by this invention into implicit SQL queries to be resolved by one or more object relational databases over the internet. This is equivalent to navigating information that leads to triggering of implicit object SQL queries over a single unified Database. This invention further elaborates unique scenario of navigating to a specific data set(s) or content(s) in XML/RDF descriptions for starting a new client window to insert/delete/update values through database transactions. Such possibilities of navigating to any data content over the web and initiating database transactions on focused data items add new dimensions and collaborations to today's mostly read-only internet information. Following embodiments will expand in this direction first describing seamless mappings from XML/RDF to relational model.

Figure 7B:
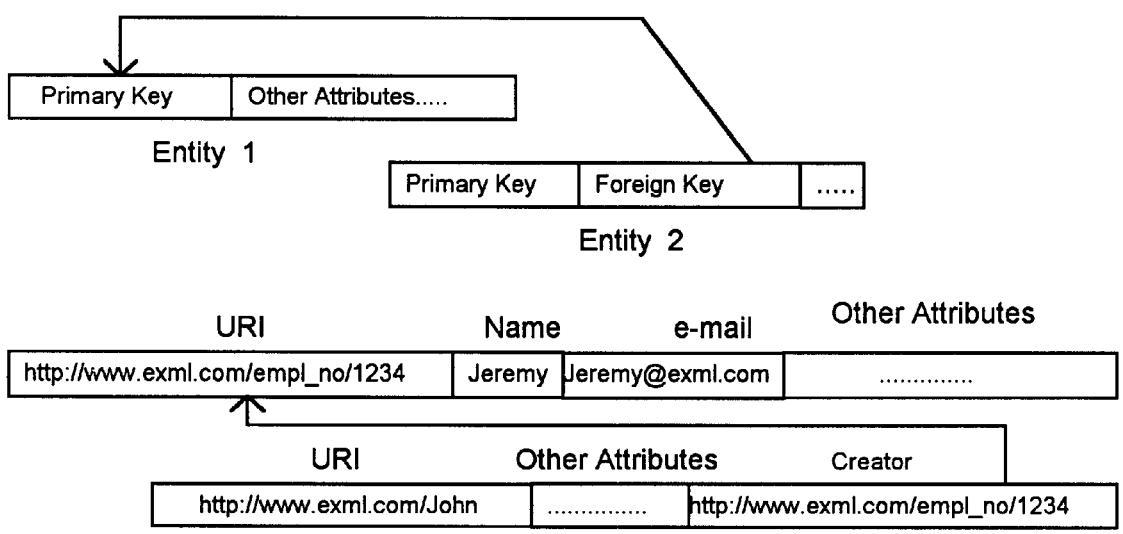
FIG. 7(b) shows relational representation of the information described in FIG. 7(a) in accordance with the present invention.

FIG. 7(a) shows a simple RDF description with ER (Entity-Relationship) diagram. FIG. 7(b) further represents it in a relational model. The ER diagram in FIG. 7(a) shows that an individual with employee number (empl_no) 1234 is named Jeremy and has the email address Jeremy@exml.com. The resource (httv://www.eml.com/John) was created by the employee. The first statement in the XML/RDF description is the version number of XML standard as assigned by the World Wide Web consortium. The RDF syntax specifies namespaces as globally unique URIs used in the document by the declarations starting with "xmlns:". In the RDF description there are two user-defined namespace schema prefixes s and v. These namespaces contain metadata definitions. For example, the Creator property is defined in namespace s. Name and Email properties are defined in namespace v. In FIG. 7(b) there are two diagrams. First diagram shows two entities with primary key/foreign key relationship. Primary key of Entity 1 is inherited as Foreign Key in Entity 2. Second diagram shows similar primary key/foreign key relationship for the XML/RDF description in FIG. 7(a). Uniform Resource Identifiers (URIs) are unique identifiers for entities over the web. These URIs can serve very well as primary keys for web entities in a relational model. A record about the individual described in FIG. 7(a) is represented with http://www.exml.com/emyl no/1234 as primary key, Name and Email as two attributes. The resource http://www.exml.com/empl no/1234 serves as the foreign key in another record carrying information about the main resource with primary key httR://www.exml.com/John. The foreign key attribute is named 'Creator' in the second record expressing the Creator relationship in FIG. 7(a).

Collection of resources is defined by RDF container object. There are three types of RDF container types, namely Bag, Sequence and Alternative. Bag is an unordered list of resources or literals. Sequence is an ordered list of resources or literals. Alternative is a list of resources or literals that represent alternatives for the value of a property. These container types in RDF are mapped to relational model of records with foreign key/primary key relationships in the following embodiments.

Figure 8A:
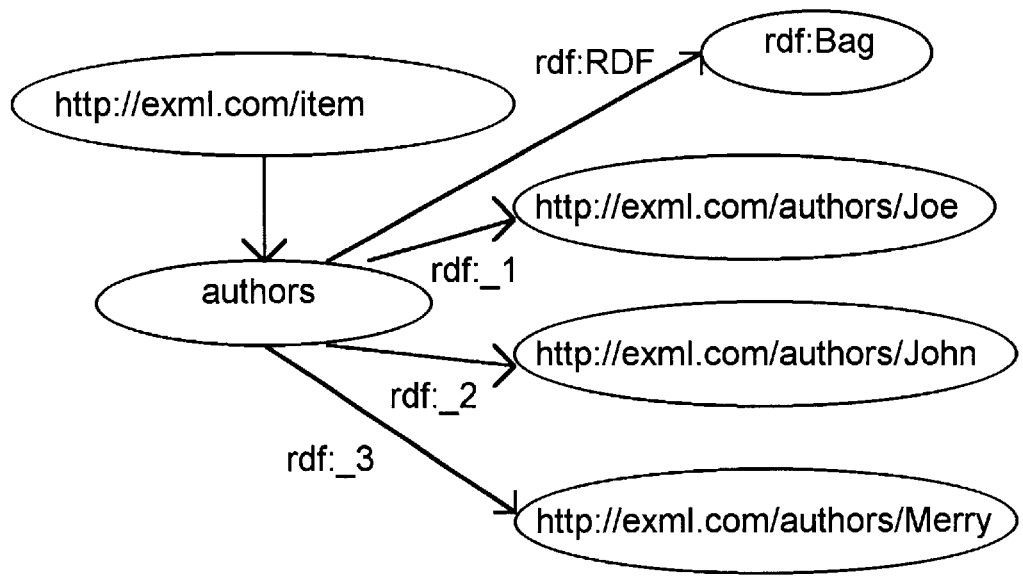
FIG. 8(a) shows an excerpt from a RDF script describing BAG container along with the corresponding entity-relationship diagram suitable for use with the present invention.

In FIG. 8(a), a simple RDF description is given with Bag container type to have a set of resources representing list of authors of resource http://exml.com/item. The ER diagram shows the resource http://exml.com/item having a relationship called 'authors' to a Bag of three resources, each one representing an author. In the XML/RDF description, namespace prefix 's' represents a schema containing metadata definition 'authors'. In FIG. 8(b), a representation with normal forms in relational model is given for the information described in FIG. 8(a). A first normal form in relational model maps one to many (1:N) relationship to record sets with foreign key/primary key relationship. Relations R1 and R2 represent relations in first normal form in the first part of the diagram representing information in FIG. 8(a). R1 has the primary key as the resource http://exml.com/item and any other attributes. R2 contains the set of authors in Bag container. Primary key for a record in R2 is an author (e.g. http:/exml.com/authors/Joe) and foreign key is the resource http://exml.com/item that is the primary key of R1. The foreign key attribute is "Author-of" which is an inverse of Author relationship also definable in schema namespace s. R1 and R2 represent one to many relationships (1:N) and a join operation can be performed over R1 and R2. If, however, there are many to many relationships (M:N) over resources and the authors in FIG. 8(a), then a second normal form representation will be required. Many to many relationships imply that a resource has many authors and an author is involved in creating many resources. Such a situation is shown in second part of FIG. 8(b) with three relations R1, R2 and R3 in second normal form. R1 has http://exml.com/item as the primary key and any other attributes for that resource. R2 has each record describing an author, for example httg://exml.com/authors/Joe is the primary key for one such record. Relation R3 is a binary relation mapping primary key of R1 to primary key of R2 capturing the M:N relationships. A SQL query with a multi table join over R1, R2 and R3 will retrieve information about resources and the corresponding authors. Depending on successive nesting in container relationships, other normal form decompositions are also possible for more complex RDF definitions.

Figure 9A:
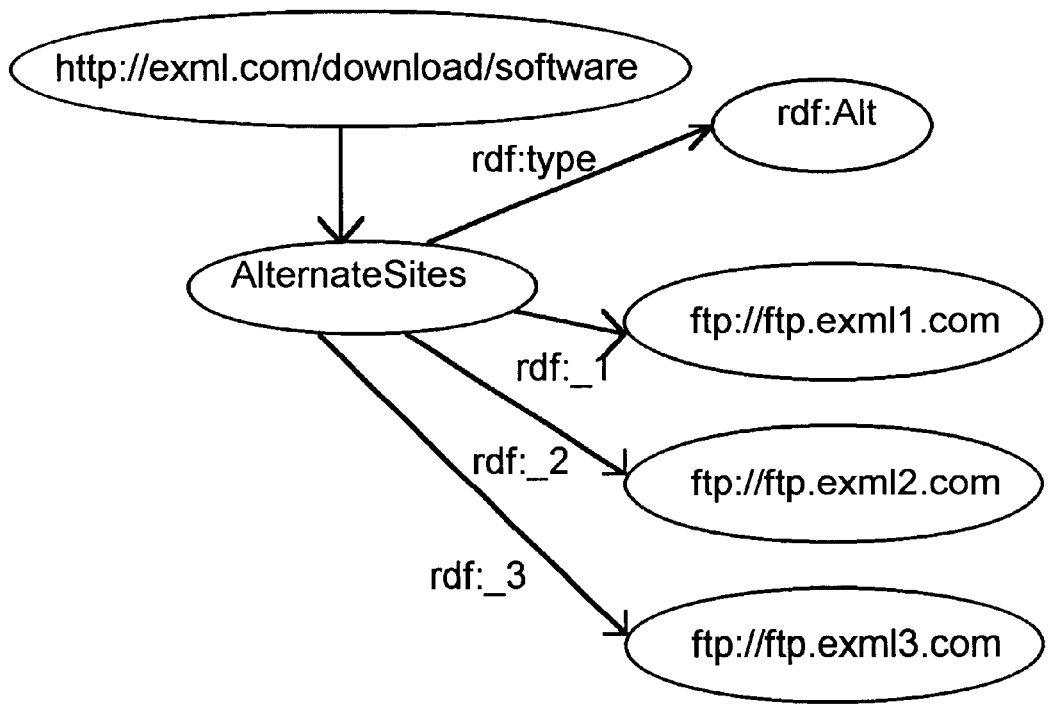
FIG. 9(a) shows an excerpt from a RDF script describing ALT container along with the corresponding entity-relationship diagram suitable for use with the present invention.

In FIG. 9(a), RDF collection type Alternative (Alt) is presented through an example and in FIG. 9(b) relational representation of the same information is given. Example contains a set of alternate sites for software to download. The resource under consideration is http://exml.com/download/software and three ftp sites are shown as part of Alt collection type in the ER diagram and in XML/RDF description. Alternatives imply OR relationships. Any one of the three ftp sites can be chosen for software to download. OR relationships are represented over subtypes and supertypes in a one to one (1:1) relationship. In FIG. 9(b) relations R1 and R2 represent 1:1 relationships. R1 contains records with a two part primary key, first part being the resource http://exml.com/download/software and the second part being a simple integer tag. R2 contains records about ftp sites where each record has the primary key as the ftp site (e.g. http://ftp.exml1.com) and foreign key being the two part primary key inherited from R1. Each record in R2 relates to a single record in R1 by inheriting composite primary key. The tag attribute is enforcing the OR relationships. A join over R1 and R2 will select one of the alternatives from R2 by assigning a tag number.

Figure 10A:
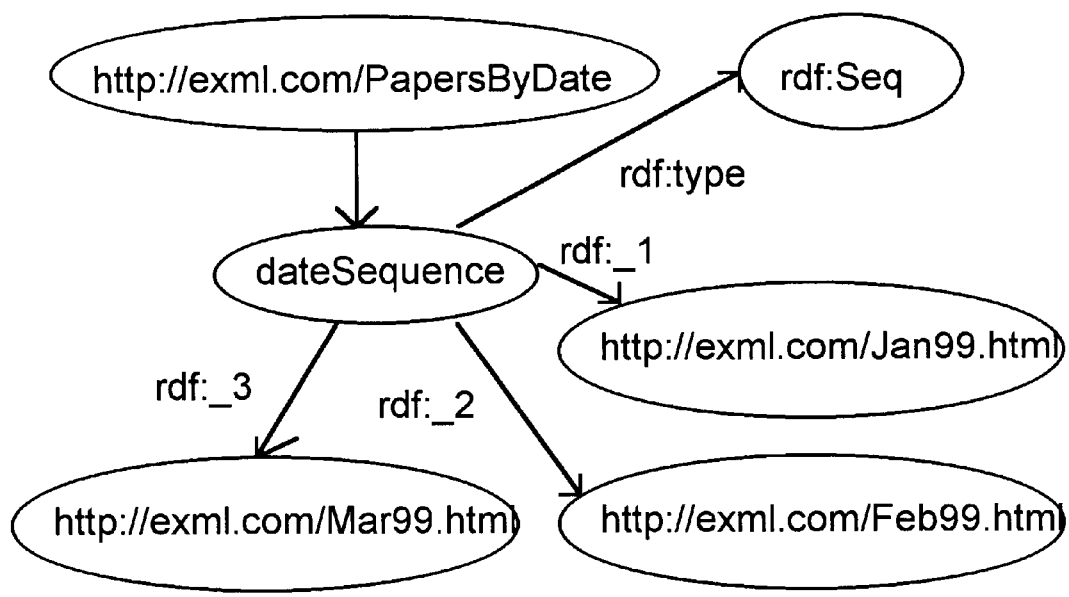
FIG. 10(a) shows an excerpt from a RDF script describing SEQ container along with the corresponding entity-relationship diagram suitable for use with the present invention.

In FIG. 10(a), a Sequence container type is shown with an example XML/RDF description and an ER diagram. In the example, papers are sorted by date sequence. The namespace schema prefix 's' is used for the metadata definition dateSequence which is having a rdf: Seq collection type. The description is made about the resource http://exml.com/PapersByDate. The ordered sequence of elements contains several resources (e.g. http://exml.com/Jan99.html). In FIG. 10(b), a relational description of the same information is presented. In a relation, primary key uniquely identifies a record and a primary key can be a compound key consisting of multiple parts. First diagram in FIG. 10(b) shows a relation with multiple part primary keys. Records in the relation are sorted according to the order of different parts in the primary key. For example, sorting will be first done on primary key (1), next on primary key (2) and finally on primary key (3). Second diagram in FIG. 10(b) shows a relation having compound primary key of two parts. First part is the resource http://exml.com/PaperByDate and second part is an element from sequence in dateSequence from FIG. 10(a). Records in this relation are sorted according to the compound primary key and thereby the sequence over the papers by date in FIG. 10(a) is maintained.

Figure 11:
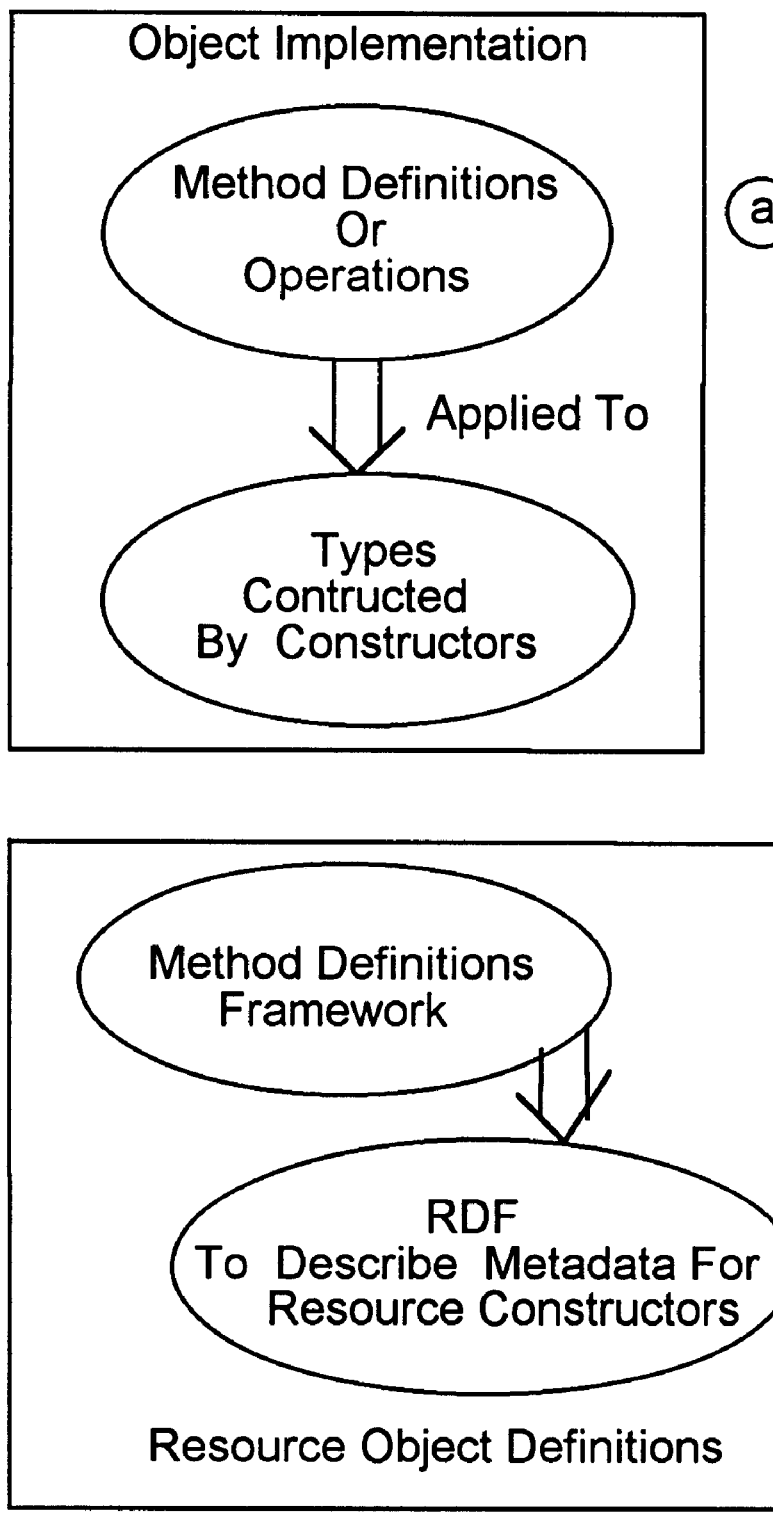
FIGS. 11(a) and (b) are block diagrams showing object definitions suitable for use with the present invention.

In FIG. 11, there are two diagrams, (a) and (b). Block diagram (a) represents an object implementation in a standard object oriented programming language like Java. Any object definition in a language like Java includes object constructors and methods. An object constructor constructs an instance with initial values for instance variables and methods are applied on those instance variables. In block diagram (b), the same idea is extended to give a resource object definition framework. Resource Description Framework describes metadata for container types and other properties for resources equivalent to constructor specifications. However, there is no concept of methods. This invention introduces the concept of virtual attributes or virtual properties for resources. A virtual attribute is an interface definition for a method that executes on properties of a resource to return a value. In a resource object definition, method definition framework can be applied to RDF metadata for constructor.

In FIG. 12, a resource object framework is shown with a method interface framework having a sequence container as parameter. The namespace prefix 's' is used to specify a schema carrying definitions of names. The RDF description is about the resource httD://exml.com/PapersByDate. XML/RDF script carries the description of a method applied to an attribute 'dateSequence' with three items forming a sequence. The method interface is defined in the same namespace. The associated diagram shows that a method called Method_To_Scan_Papers is applied to list of papers in the Sequence container. The schema contains all necessary definitions for the method including the location for program implementation of it. The method interface has three parameters. Two input parameters have the property name s:input_param and an output parameter has the property name s:output_param. For each such parameter, there is a name variable and a type variable to specify name and type of the parameter. For example, first input_param has name "sequence_of_papers" and type "rdf:Seq". The value of the first input parameter is a sequence under the name dateSequence.

Figure 13:
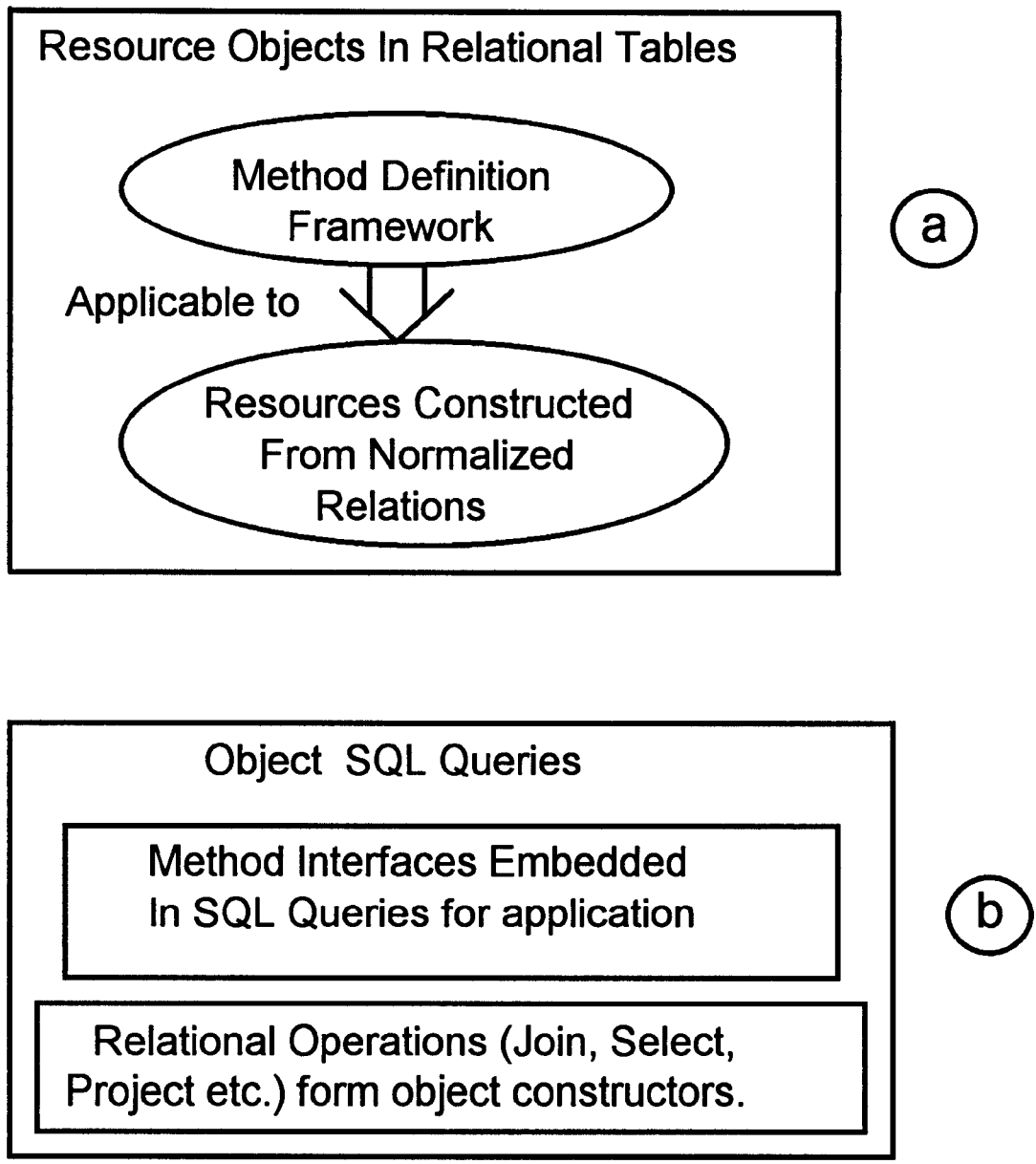
FIGS. 13(a) and (b) are block diagrams showing methods and object SQL queries suitable for use with the present invention.

In FIG. 13 there are two diagrams, (a) and (b). In block diagram (a), a resource description in normalized relational tables is constructed before a method is applied. In block diagram (b), an object SQL query is shown as a block containing two other inner blocks. One inner block shows a method interface embedded in SQL query and the other inner block shows a relational operation to construct an object. The inner block for relational operation represents operations like join, select, project etc. on normalized tables for resources. A method interface in an object SQL query is applied to an object after such a construction. These concepts will be used in the following embodiments.

This invention extends the scope by representing SQL queries over sets of resources in XML/RDF format. Such XML/RDF representations can be implicitly or explicitly generated for read-only access over a unified Database of Databases. In FIG. 14, a simple XML/RDF script for a join operation is shown. The schema for relational operator definitions is represented by prefix 'q' in the figure. Example shows one XML/RDF script that describes a resource http://exml ioin.com/example which has an attribute called 'join_ query'. A query is expressed by representing operators and key words in XML markup where all these operators and keys words from SQL language are defined in a namespace schema. The parameters and operands to operators are all resources represented by Uniform Resource Identifiers or literals. In the example query, a join is taken over resources http://exml join.com/exl and http://exml join.com/ex2 where these resources are RDF descriptions consisting of both data and metadata. In the 'Where' clause of SQL expression, an 'EquiJoin' operation is defined with the join predicate as an equality operator on two attributes "Name1" from RDF description in hftt://exml join.com/ex1 and "Name2" from RDF description in http://exml join.com/ex2. In the query there is a list of attributes selected from the result of join. Selection is represented by 'Project' operator on the result of 'Equijoin'. In FIG. 14, three attributes are selected, "Name3" from http://exml join.com/ex1 and "Name4", "Name5" from http://exml join.com/ex2. The XML/RDF script describing SQL query is processed for sending to one or more object relational engine(s).

As described previously, an object SQL query comes with method interfaces embedded inside SQL. In FIG. 15, such a possibility of embedded method interface in SQL script is shown in XML/RDF format. The query is similar to the query script in FIG. 14 except the item under 'Project' operator. A method interface with proper input parameters is represented under 'Project' operator. The operators and key words used in the query expression are defined in a schema represented by prefix 'q' whereas method interface name and all other names in the interface are defined in a schema prefixed by 's' . The diagram associated with XML/RDF script shows a method being applied to the result of a join operation over two resources. This method interface has two input parameters, name1 and name2 with input values from "Name3" of http://exmpl join.com/ex1 and "Name4" of http://exmpl join.com/ex2 respectively.

Figure 16:
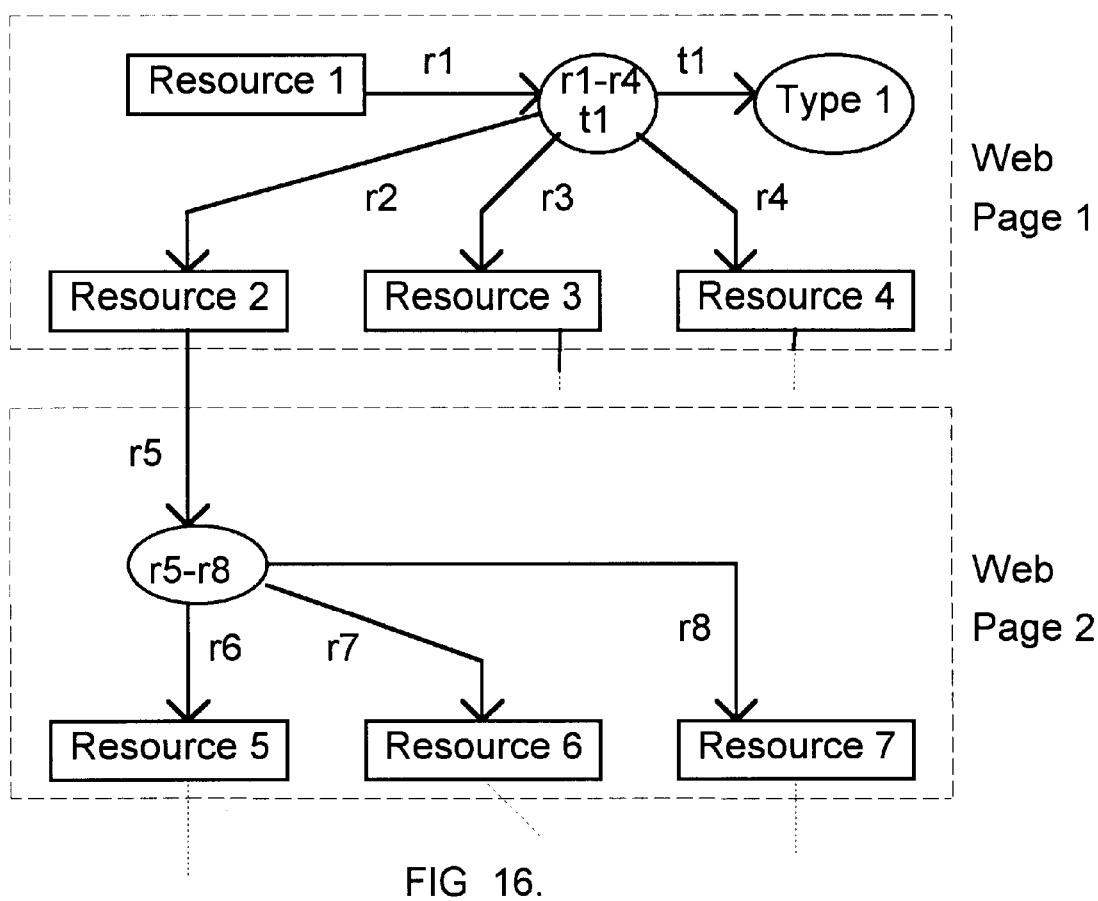
FIG. 16 shows a diagram of entities as resources related through predefined relationships within a web page and across multiple web pages.
Figure 17:
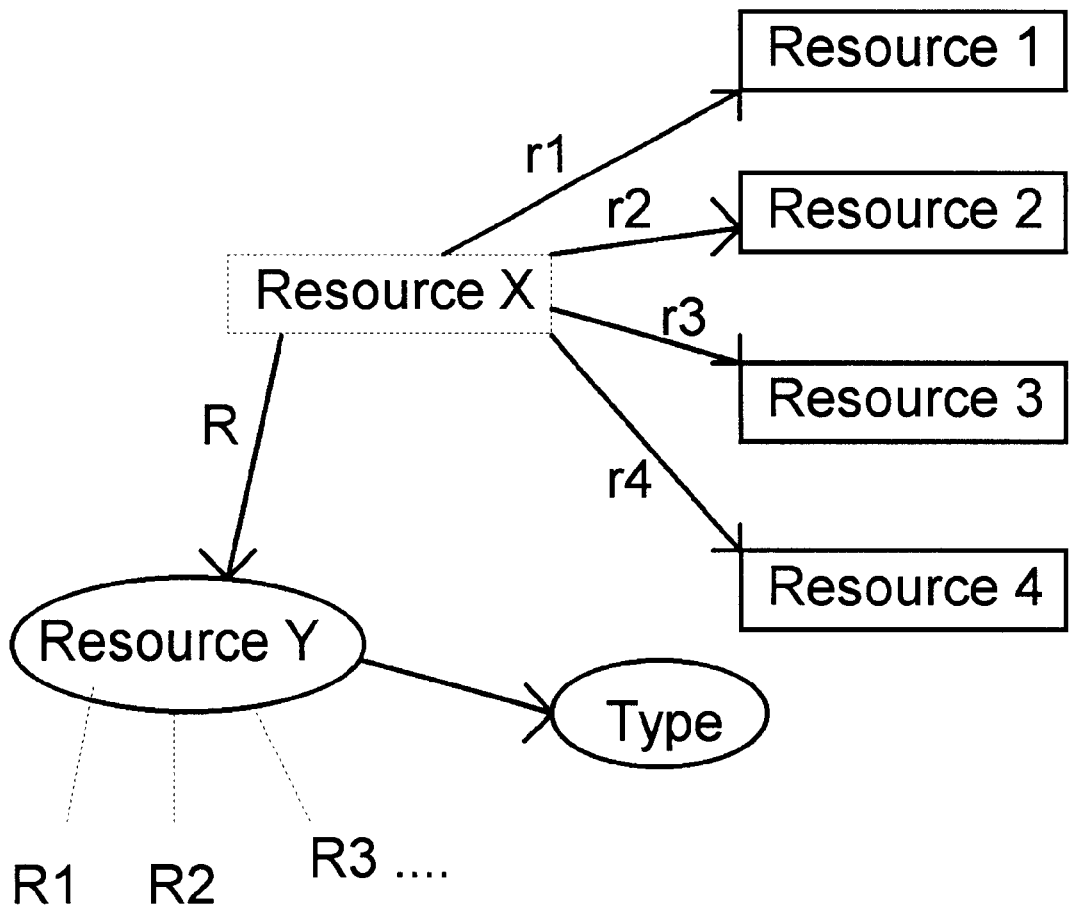
FIG. 17 is a diagram showing a resource as an entity relating to sets of other resources by relationships constructed and visually represented forming a web document.

FIG. 16 shows a number of resources and relationships in entity-relationship diagram. Various XML/RDF documents uniformly present metadata information over resources and property values. It is possible to scan through such information to extract only the metadata information and present to the user for visualization. In reality, web pages contain image, text and other large objects requiring lots of time and bandwidth for transmission over the internet. A faster solution will be to extract just the metadata information for transmitting over the internet and then users can make decision after looking at the overall metadata information whether to view a specific component(s) in details or to generate an object SQL query. FIG. 16 shows entity-relationship diagram extending over two or more web pages. Resource 2 in web page 1 is related to a set of resources (Resource 5, Resource 6, Resource 7) in web page 2. Such an entity-relationship diagram extending over one or more web pages and depicting just the metadata information could be extracted for quick visualization and efficient decision making. In FIG. 17, further elaboration and use of above mentioned concept is presented. Since entity-relationship diagrams can be visualized and manipulated with insertion, deletion and creation of new components in the diagram, visual tools can be devised to represent a new resource and its relationships. FIG. 17 shows Resource X created as a new entity and arrows representing relationships to other resources are added pictorially. An arrow representing relationship R connects to a collection type. Such a creation of resources and their relationships through diagrams of metadata information will be implicitly translated into XML/RDF documents.

Figure 18:
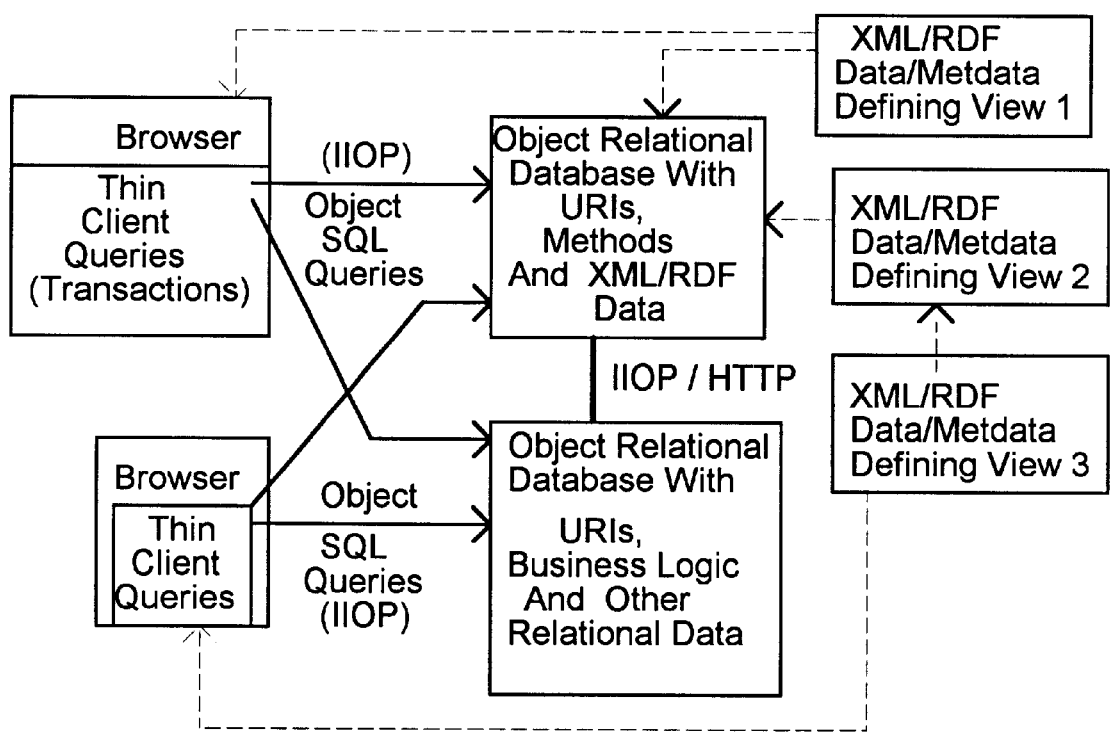
FIG. 18 is a block diagram to show distributed computing with component object relational databases and many XML/RDF views over the internet as focused in the invention.

In FIG. 18, a block diagram is shown with thin clients, object relational databases and XML/RDF data/metadata views. XML/RDF documents with metadata definitions along with data sets constitute a view over a database. A part of a single database or union over several databases can be viewed by a specific XML/RDF definition in a document. As the database(s) changes with insert/delete/update, such views can be updated by generating new documents and replacing the old ones. Thin clients consist of windows created from browsers to perform transactions over databases through persistent connections (IIOP). In FIG. 18, XML/RDF documents can be viewed by browsers to navigate through multiple documents with Uniform Resource Identifiers for finding details of data/metadata definitions. After inspecting data and metadata in one or more XML/RDF documents, a thin client window could be created for transactions over an object relational database for a focused data item(s). Such a transaction could be performed on a data item, data set or text, image contents. Transactions are performed by object relational databases through collaborations and the result set is formatted in XML/RDF to replace existing XML/RDF documents or to create new documents for the client to visualize.

Figure 19:
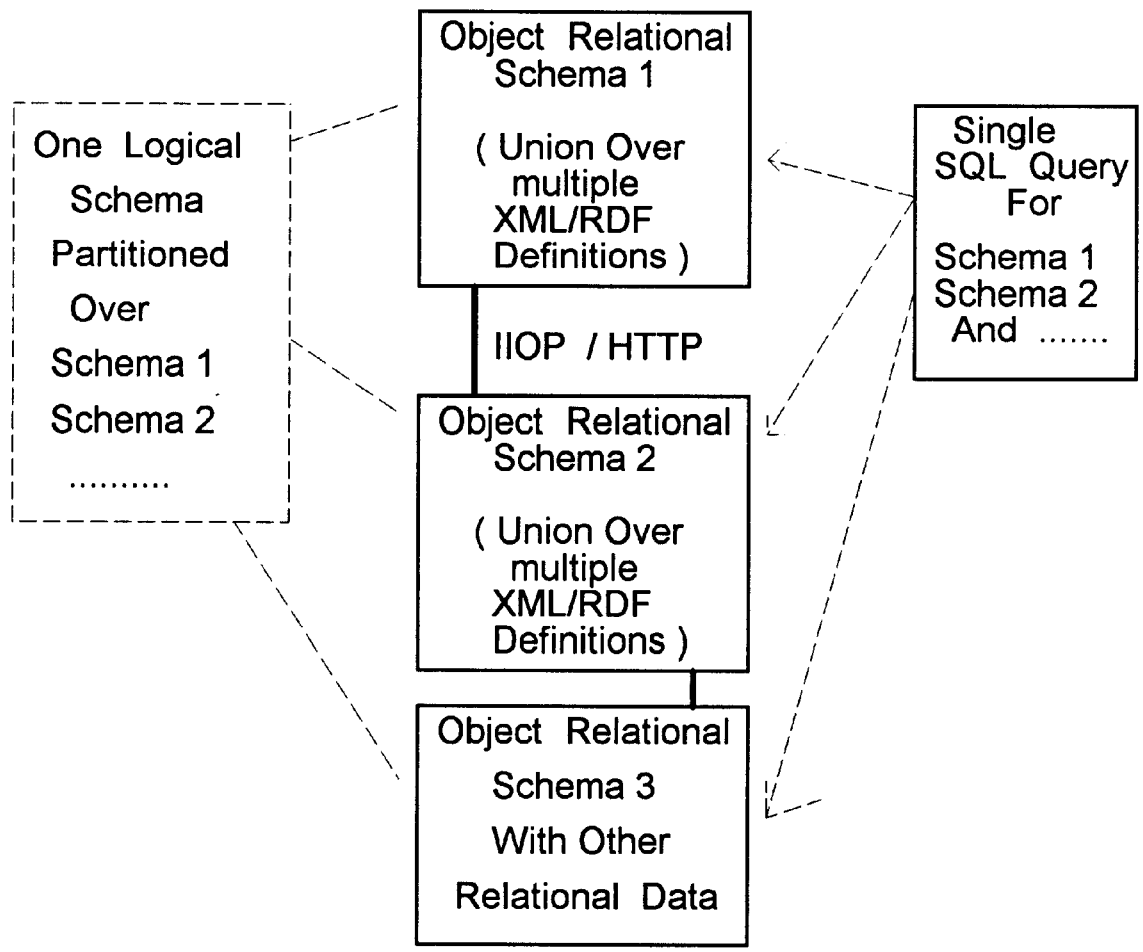
FIG. 19 is a block diagram to show a logical schema being partitioned into many object relational database schema over the internet and a single query made over the logical schema as elaborated in the invention.
Figure 20:
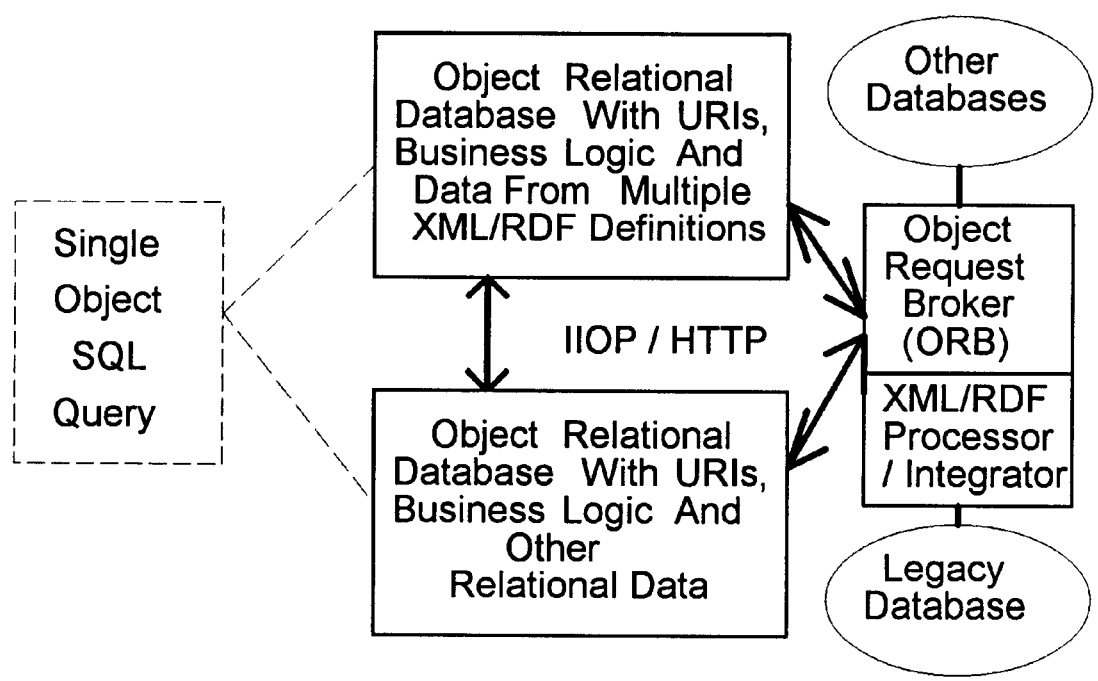
FIG. 20 is a block diagram to show a single SQL query made over a set of relational database schema in disparate locations along with legacy databases and existing central databases in accordance with the invention.

In FIG. 19, a block diagram shows a logical schema partitioned over multiple physical schemas over the internet. Schema 1 is a component object relational database containing information from union over many XML/RDF document definitions. Schema 2 is another instance of object relational database over the internet similar to schema 1. Schema 3 is a component object relational system with other relational data. These components communicate with each other through HTT? and IIOP protocols for collaborative query executions. FIG. 19 also shows a block representing a single object SQL query triggered against a unified logical schema. The query gets executed in many component physical schema locations. In FIG. 20, a block diagram extends the notion in FIG. 19 to show how legacy and other existing relational databases can be seamlessly accessed over the internet by the use of single object SQL triggered against a unified schema. Object Request Brokers and XML/RDF integrators will serve as a middleware for the legacy and existing large installed database systems. Object relational database components over the internet communicate with legacy databases seamlessly through XML/RDF documents and object request brokers. This invention extends the scope of seamless integration of any type of database systems over the internet allowing querying and transactional capabilities through a browser and a thin client window respectively.

I claim:

1. In a network of computers over the internet, a multi-tier client/server system comprising of:
   A) Clients with browsers capable of processing documents in Extensible Markup Language (XML) and Resource Description Framework (RDF) carrying data/metadata information for electronic commerce and electronic business where these clients make synchronous communications through Hypertext Transfer Protocol (HTTP) with various internet sites and with object relational database servers at multiple locations consisting of XML/RDF integration software and software compliant with Common Object Request Broker Architecture;
   B) Clients with browsers capable of creating and maintaining thin client windows on demand for persistent connectivity through Internet Inter ORB Protocol (IIOP) with remote object relational databases over the web for performing transactions;
   C) Relational database servers with schema and business application logic defined in the form of object packages comprising:
      a) User-defined packages for providing call specifications for a set of interfaces to embed in Structured Query Language (SQL) queries where these interfaces are implemented as methods in Java classes and are applied to records resulting from execution of relational operations;
      b) User-defined packages for specifying operations over attribute values from multiple tables where interface definitions for methods and operators carry parameter definitions along with parameter types defined directly as table names and attribute names for safe execution semantics;
      c) User-defined packages specifying interfaces where a parameter type definition maps to another interface existing at a local or remote schema object on the internet;
      d) User-defined packages specifying interfaces where parameter type definitions map to tables and attributes existing at a local or remote schema object on the internet;
      e) User-defined packages where Uniform Resource Identifiers (URIs) are used to locate elements in remote schema objects on the web and such URIs defining schema objects are stored in data dictionaries or repositories;
      f) Method and operator interfaces defined in user-defined packages implemented in Java classes;
   D) Executions of application logic in object packages on local or remote schema objects performed by Object Request Broker services in Common Object Request Broker Architecture (CORBA).

2. A system as defined in claim 1 wherein said clients and said object relational database servers communicate through documents in Extensible Markup Language and Resource Description Framework as well as thin client persistent windows for transactions and wherein said multiple relational database servers further communicate among themselves through documents in Extensible Markup Language and Resource Description Framework as well as through persistent connectivity in Internet Inter ORB Protocol (IIOP), switching roles as clients and servers.

3. In a network of computers over the internet, a multi-tier client/server system comprising of:
   (a) Multiple related internet sources representing documents in Extensible Markup Language (XML) and Resource Description Framework (RDF) for describing data and metadata for various resources and their interrelationships necessary for electronic commerce and electronic business;
   (b) Resource Description Framework (RDF) describing properties and values of properties for resources identified by Uniform Resource Identifiers (URIs) where these URIs are used as primary keys and foreign keys in a normalized relational model of description for these said relationships over resources;
   (c) Resource Description Framework (RDF) describing properties and values of properties for resources mapped to tables with foreign key/primary key relationships in one or more relational databases where foreign key attributes may be named to express same or inverse meaning of corresponding relationship names in RDF description, these names being defined in XML namespaces and schema definitions;

(d) Resource Description Framework (RDF) describing properties and values of properties for resources further comprises:
  (1) RDF container types, namely Bag, Sequence and Alternative to represent collection of resources where these container types are mapped to normalized relations in relational model;
  (2) RDF Bag container type with one-to-many relationships mapped to two tables in first normal form where one table contains primary key as the URI of the resource under description and the other table contains primary keys as the URIs of the resources in Bag container along with foreign key inherited from first relation;
  (3) RDF Bag container type with many-to-many relationships mapped to three tables in second normal form where first table contains primary key as the URI of a resource under description, second table contains primary keys as the URIs of resources in Bag container and third table maps primary keys of first table to primary keys of second table capturing many to many relationships;
  (4) RDF Bag container type with more complex nesting of relationships normalized into relations in higher normal forms;
  (5) RDF collection type Alternative (Alt) mapped to two relations in one-to-one relationship where the first relation contains records with a two part primary key, first part as the URI of the resource under description and second part a tag to identify a specific alternative, and the second relation contains primary key as URI of a resource in Alternative container along with foreign key being the two part primary key inherited from first relation;
  (6) RDF collection type Sequence (Seq) mapped to a single relation with multi-part primary key where first part is the URI of the resource under description and second part is URI of a resource in Sequence container maintaining sequence by sorting over compound primary key;

(e) Data and metadata information stored in a relational database or part of a relational database or union over multiple relational databases mapped to documents in Extensible Markup Language and Resource Description Framework for entities, properties and values of properties where such entities and properties are URIs identifying table names and attribute names respectively.

4. A system as defined in claim 3 wherein said documents in Extensible Markup Language and Resource Description Framework further represent queries in Structured Query Language (SQL) by defining operators and key words of SQL language in Extensible Markup Language namespace schema definitions and wherein operands to such relational operators are either resources represented by Uniform Resource Identifiers or literals.

5. A system as defined in claim 4 wherein said Structured Query Language (SQL) queries embed method interfaces represented in Extensible Markup Language and Resource Description Framework and wherein such method interface names along with all other parameter names within method interfaces are defined in Extensible Markup Language namespace schema definitions.

6. A system as defined in claims 5 wherein said object SQL queries with or without embedded method interfaces are implicitly generated as a result of property based navigation and information requirement specification from multiple related documents in Extensible Markup Language and Resource Description Framework.

7. A system as defined in claim 6 wherein said implicitly generated client queries travel to said object relational databases for collaborative execution of said queries and wherein said object relational database servers further generate documents in Extensible Markup Language and Resource Description Framework for representing results of such said queries for sending back to said clients for further navigation.

8. A system as defined in claim 3 wherein said multiple documents in Extensible Markup Language and Resource Description Framework constitute different views over a unified Database consisting of multiple object relational databases over the web and wherein such views are updated by generating new documents to replace old ones as changes are made to said databases by inserts, deletes and updates.

9. A system as defined in claim 3 wherein said metadata information inside a unified Database over multiple disparate relational databases over the web are possible to be extracted for visualizing entities with various relationships without fetching detailed values of attributes from databases and wherein such entity-relationship diagrams represented in Extensible Markup Language and Resource Description Framework are sent to client locations for visual inspection, manipulation and focused selection of entities or attributes for further detailed visualization, thereby saving critical traversal time of large contents and data values of unnecessary entities and attributes over the internet.

10. A system as defined in claim 9 wherein said entity-relationship diagrams representing metadata information over resources and relationships are visualized through software visual tools for various manipulations and wherein such tools are used to create new resources with relationships to existing entities or collection of entities, forming new web pages by implicit translations of such said entity-relationship diagrams into documents in Extensible markup Language and Resource Description Framework.

11. In a network of computers over the internet, a multi-tier client/server system incorporating distributed business application logic with relational data at disparate locations comprising of:
  A) Multiple documents in Extensible Markup Language and Resource Description Framework with data and metadata definitions to view, navigate and trigger implicit queries against a logical schema definition for a single unified Database consisting of multiple disparate relational database instances with tables, foreign key/primary key relationships, user-defined types and business application logic in object packages;
  B) Multiple documents in Extensible Markup Language and Resource Description Framework with data and metadata definitions for navigating through a single unified schema containing many instances of component physical schema of relational databases, so as to locate and focus on a data set(s), a text item or any other content(s) and to initiate transaction on such focused item(s) in a separately created thin client window(s) establishing persistent connectivity with any remote physical database instance(s);
  C) A single unified virtual Database for navigation, transaction processing and implicit object relational query processing over the web, defined over multiple physical component schema consisting of:

a) Uniform Resource Identifiers (URIs) used for locating remote schema objects;
b) Relations as view caches to maintain relationships over foreign keys inherited from a table in the local component schema and primary keys of a table in a remote schema located by URIs;
c) Relations as view caches to enforce referential integrity across component physical relational databases over the internet;
d) Business logic in the form of object packages implemented in Java classes to incorporate processing logic over a join or other relational operations performed in a local or remote component schema;
e) View cache tables maintaining an attribute(s) which is an user-defined type with an associated object package implemented as Java class at a remote schema location and URIs as attribute values for locating primary keys in that remote schema.

D) Property based specification and navigation through multiple documents in Extensible Markup Language and Resource Description Framework for implicitly generating object SQL queries to represent a multiple resource join in a single logical schema where such a join is performed as multiple partial joins at disparate component physical schema with communications through Internet Inter ORB Protocol and Hypertext Transfer Protocol at each schema location;

E) Property based navigation through multiple documents in Extensible Markup Language and Resource Description Framework for implicitly generating and executing object SQL queries leading to results from many levels of business logic applications on a complex join in a logical schema where such a business logic application on a complex join is executed as cooperative processing of distributed business logic on partial joins in component schema at disparate locations communicating through Object Request Brokers;

F) Object SQL query processing over a single unified database over the internet in two separate stages of processing where stage (1) of processing resolves metadata definitions from disparate schema components to decompose an object SQL query into separate components and stage (2) of processing executes such SQL components in physical databases;

G) Object SQL query executions in a single unified Database over the internet leading to collaborations in stage (1) of computations by: (a) sending proper sets of records to remote schema locations, (b) receiving resulting records from remote schema locations, (c) creating temporary tables in local database for storing record sets received and (d) triggering necessary SQL components to perform join over record sets from local and remote databases.

12. A multi-tier client/server system defined in claim 11 wherein said virtual unified Database over disparate database components comprises two distinct SQL processing for stage (1) and stage (2) of computations and wherein each physical database component over the internet contains separate software layers for collaborative object SQL processing in stage (1) of computation.

13. A system as defined in claim 11 wherein said logical schema for a unified Database partitioned into said physical schema components comprises means of compiling object SQL (Structured Query Language) queries triggered directly or expressed in Resource Description Framework documents and executing such queries against the said logical schema irrespective of locations and distribution of physical schema components by the steps including:
A) Keeping non-detailed metadata (information about relational data) for the logical schema at each component physical schema locations or at a centralized repository so that locations of other component schema are available to said stage (1) computation of SQL processing for all tables, types and packages used in a query;
B) Parsing a Structured Query Language (SQL) query at a physical component schema location by said stage (1) SQL processing layer to resolve definitions for tables, types and packages whatever is locally available and extracting portion of the query for sending it to other locations for preparation by corresponding said stage (1) SQL processing layers at disparate locations wherever the relevant metadata is available;
C) Preparing fully a SQL query at multiple sites by successively parsing with locally available metadata and initializing any object packages used at each component schema location by said stage (1) SQL processing software layers;
D) Beginning execution only after complete preparations at all involved locations;
E) Performing relational operations by said stage (2) SQL processing layers and executing application logic at each component schema location by collaborations at said stage (1) SQL processing layers through Object Request Brokers;
F) Completing any business logic execution at a location depends on successive completion of other executions at other locations when there are dependencies with nested applications and generating result sets in Extensible Markup Language and Resource Description Framework by said stage (1) SQL processing layers for transporting back to client locations.

14. A system as defined in claim 13 wherein said preparation phase and said execution phase of an SQL query further comprises means of including internet locations with centralized legacy databases and other existing data stores with middleware software for processing documents in Extensible Markup Language and Resource Description Framework and also middleware software compliant with Common Object Request Broker Architecture.

15. A system as defined in claim 14 wherein said legacy databases and said existing centralized data stores carrying no object packages for business logic and carrying necessary middleware software for processing documents in Extensible Markup Language and Resource Description Framework further comprises means of supporting SQL queries with embedded business logic against such legacy databases by defining object packages in other component schema locations.

* * * * *